(12) United States Patent
Horie

(10) Patent No.: US 8,081,429 B2
(45) Date of Patent: Dec. 20, 2011

(54) ELECTRONIC DEVICE AND FRAME

(75) Inventor: Takefumi Horie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 12/585,650

(22) Filed: Sep. 21, 2009

(65) Prior Publication Data

US 2010/0014272 A1  Jan. 21, 2010

Related U.S. Application Data

(63) Continuation of application No. PCT/JP2007/056450, filed on Mar. 27, 2007.

(51) Int. Cl.
*H05K 5/00* (2006.01)
*H05K 7/00* (2006.01)

(52) U.S. Cl. ......... 361/679.02; 361/679.01; 361/679.17; 361/679.58; 361/679.59

(58) Field of Classification Search ............. 361/679.01, 361/679.02, 679.17, 679.28, 679.59, 679.58
See application file for complete search history.

(56) References Cited

U.S. PATENT DOCUMENTS

| | | | | |
|---|---|---|---|---|
| 5,283,862 | A * | 2/1994 | Lund | 345/173 |
| 5,298,681 | A | 3/1994 | Swift et al. | |
| 2004/0246667 | A1 * | 12/2004 | Maskatia et al. | 361/683 |
| 2005/0078444 | A1 * | 4/2005 | Hong | 361/683 |

FOREIGN PATENT DOCUMENTS

| | | |
|---|---|---|
| JP | 6-21672 A | 1/1994 |
| JP | 6-215040 | 8/1994 |
| JP | 6-266472 A | 9/1994 |
| JP | 7-307587 | 11/1995 |
| JP | 2001-34178 | 2/2001 |
| JP | 2002-278652 A | 9/2002 |
| JP | 3097007 | 1/2004 |
| JP | 2004-288149 | 10/2004 |
| JP | 2006-278186 A | 10/2006 |
| JP | 2006-304240 | 11/2006 |

OTHER PUBLICATIONS

International Search Report for PCT/JP2007/056450, mailed Jul. 3, 2007.
English Translation of the International Report on Patentability, mailed Oct. 29, 2009 and issued in corresponding International Patent Application PCT/JP2007/056450.
Japanese Office Action mailed Aug. 9, 2011 for corresponding Japanese Application No. 2009-506173, with English-language translation.

* cited by examiner

*Primary Examiner* — Anthony Haughton

(57) ABSTRACT

An electronic device workable on electric power and able to avoid troublesome connection and handling of a power cable, and a frame that supports the electronic device. A power terminal of an image display module, a power terminal of a main unit module, and a power terminal of a connector module are supplied with electric power from power terminals of frames provided in the frames and a joint part, in a state where a frame receiving section of the image display module, a frame receiving section of the main unit module, and a frame receiving section of the connector module are supported on the frames.

15 Claims, 36 Drawing Sheets

190

ELECTRONIC DEVICE AND FRAME

CROSS-REFERENCE TO RELATED APPLICATION

This is a continuation application of PCT/JP2007/056450, filed on Mar. 27, 2007.

TECHNICAL FIELD

The present invention relates to an electronic device workable on electric power, and a frame that supports the electronic device.

BACKGROUND ART

Conventionally, various types of electronic devices have been developed and widely used. Among them, as a personal computer provided with an information calculation function (hereinafter, abbreviated as PC), a portable note PC and a stationary desktop PC are widely used. In the portable note PC, an image display unit having a display screen and a main unit are coupled by means of a hinge member that fastens them so as to be freely closed and opened. The main unit incorporates such as a circuit board on which a central processing unit (CPU) for executing a program and an electronic circuit are mounted, and a hard disk in which information is stored. The main unit also serves as a keyboard with plural operational keys arranged on a top surface of the portable note PC. The stationary desktop PC includes a main unit incorporating a circuit board on which a CPU for executing a program and an electronic circuit are mounted, and a hard disk in which information is stored; an image display unit having a display screen for displaying an image; and a keyboard for key operation or the like, each as separate casings.

Herein, various peripheral devices may be connected to the PC. Incidentally, there is a proposition of a multistage mounting device in which a fixed shelf and a hanging shelf for mounting each component of a computer system formed of the desktop PC and the peripheral devices connected to the desktop PC in a multistage fashion are provided (refer to Japanese Laid-Open Patent Publication No. 07-307587, for example).

DISCLOSURE OF INVENTION

By using the multistage mounting device proposed in the Japanese Laid-Open Patent Publication No. 07-307587, the computer system may be arranged in a compact manner. However, since each component of the computer system is workable on electric power, it is necessary to connect a power cable to each component, and it is possible that a user has an impression that connection and handling of the power cable is troublesome.

Accordingly, it is an object of the invention to provide an electronic device in which troublesome connection and handling of the power cable is avoided, and a frame for supporting the electronic device.

According to a first aspect of the invention, an electronic device includes a frame; and a module having a frame receiving section supported by the frame, wherein the module includes a module side power terminal that is supplied with electric power from the frame, on the frame receiving section, and the frame includes a frame side power terminal that supplies electric power to the module side power terminal in a state in which the frame receiving section is supported by the frame.

In the electronic device of the present invention, the module side power terminal provided on the frame receiving section in a state in which the frame receiving section of the module is supported by the frame is supplied with electric power from the frame side power terminal provided on the frame. Therefore, according to the electronic device of the present invention, it is not necessary to connect the power cable for supplying the electric power to the module, so that troublesome connection and handling of the power cable may be avoided.

In the electronic device of the present invention, it is preferable that the module further includes, along with the module side power terminal, a module side signal terminal that transmits a signal between the module and the outside, on the frame receiving section, and the frame further includes, along with the frame side power terminal, a frame side signal terminal that relays a signal transmitted between the module side signal terminal and the outside.

According to this preferred mode, it is not necessary to connect the signal transmission cable to the module when realizing the transmission of the signal between the module and the outside, so that troublesome connection and handling of the signal transmission cable may be avoided.

It is preferable that the electronic device of the present invention further includes another module having a frame receiving section supported by the frame, such that the another module has a function different from the function of the module and includes a module side power terminal that is supplied with electric power from the frame side power terminal.

According to the electronic device further provided with the another module, it is not necessary to connect the power cable for supplying the electric power also to the another module, and troublesome connection and handling of the power cable is avoided, so that the module may be added more easily.

It is preferable that the electronic device of the present invention further provided with the another module further includes, along with the module side power terminal, a module side signal terminal that transmits a signal between the another module and the outside, on the frame receiving section of the another module.

According to this preferred mode, it is not necessary to connect the signal transmission cable to another module when realizing the transmission of the signal between the another module and the outside, and troublesome connection and handling of the signal transmission cable may be avoided, so that the module may be added more easily.

It is preferable that, in the electronic device of the present invention, the frame is a frame extending in a bar shape and has a groove extending in a longitudinal direction, and the frame receiving section has a protrusion fitting in the groove and wall surfaces on both sides of the protrusion have shapes to abut wall surfaces on both sides of the groove of the frame.

According to this preferred mode, the frame receiving section is surely supported by the frame, so that the module side power terminal and the frame side power terminal are surely connected.

It is preferable that, in the electronic device of the present invention, the frame side power terminal is a power terminal extending in the longitudinal direction of the frame, and further includes an AC adapter having a power converting section that converts AC power to DC power to be supplied to the module and a power supplying section that is supported on any of plural or consecutive positions of the frame and that has an adapter side power terminal contacting the frame side power terminal to supply the DC power obtained by the power converting section to the frame side power terminal.

According to the electronic device further provided with such AC adapter, the DC power is stably supplied to the module by connecting the AC adapter to the AC power supply, so that it is preferable. Also, the power supplying section is supported on any of the plural or consecutive positions of the frame, so that a degree of freedom of installation of the AC adapter is high.

Furthermore, in the electronic device of the present invention, the module may be an image display module having a display screen on the front thereof; the module may be a main unit module incorporating a circuit board on which a CPU that executes a program is mounted; the module maybe a connector module provided with at least one of a data communication connector to which a communication cable for data communication is connected, a media slot to which a recording medium is removably inserted, and a PC card slot to which a PC card is removably inserted; or the module may be a speaker module provided with a speaker.

It is also preferable that the electronic device of the present invention further includes a protecting member having a convex stripe detachably fitting in the groove formed on the frame, to cover the frame side power terminal.

According to the electronic device further provided with such protecting member, the frame side power terminal is protected from dust and humidity, and electrification and short circuit are prevented from occurring. Also, the user is prevented from being injured by touching the frame.

Moreover, it is preferable that, in the electronic device of the present invention further provided with the protecting member, the protecting member is formed of an elastic material.

According to this preferred mode, a shock to the frame is moderated, so that damage of the frame and the frame side power terminal provided on the frame is prevented.

Still further, it is preferable that the electronic device of the present invention further includes a cap that fits in an end of the frame.

According to the electronic device further provided with such cap, the user is prevented from being injured by touching the end of the frame.

According to a second aspect of the invention, a frame supports a frame receiving section of a module having the frame receiving section, and the frame includes a frame side power terminal that supplies electric power from the frame receiving section to the module.

According to the frame of the present invention, it is not necessary to connect the power cable for supplying the electric power to the module when using the frame together with the module as in the case of the electronic device of the present invention, so that troublesome connection and handling of the power cable may be avoided.

It is preferable that the frame of the present invention further includes a frame side signal terminal that relays transmission of a signal between the module and the outside through the frame receiving section.

According to this preferred mode, it is not necessary to connect the signal transmission cable to the module when realizing the transmission of the signal between the module and the outside when using the frame of the present invention together with the module, so that troublesome connection and handling of the signal transmission cable may be avoided.

It is preferable that the frame of the present invention extends in a bar shape and has a groove extending in a longitudinal direction, into which the frame receiving section fits.

According to this preferred mode, the frame receiving section is surely supported by the frame when using the frame of the present invention together with the module, so that the module side power terminal and the frame side power terminal are surely connected.

It is preferable that the frame of the present invention supports a power supplying section for DC power supply of an AC adapter that converts AC power to DC power to be supplied to the module, on any of plural or consecutive positions, and the frame side power terminal passes through the plural or consecutive positions to extend in the longitudinal direction of the frame, and is supplied with the DC power from the power supplying section.

According to this preferred mode, the DC power is stably supplied to the module by connecting the AC adapter to the AC power supply when using the frame of the present invention together with the module, so that it is preferable. Also, since the power supplying section is supported on any of the plural or consecutive positions of the frame, so that the degree of freedom of installation of the AC adapter is high.

According to the present invention, the electronic device in which troublesome connection and handling of the power cable is avoided, and the frame supporting such electronic device are provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BEST MODE FOR CARRYING OUT THE INVENTION

Hereinafter, embodiments of the present invention will be described with reference to drawings.

Herein, as an example of an electronic device, description will be made about a stationary desktop personal computer that includes a main unit incorporating a circuit board on which a central processing unit (CPU) for executing a program and an electronic circuit is mounted, a hard disk for storing information and the like; an image display unit having a display screen for displaying an image; and a keyboard for performing key operation, each as separate casings (hereinafter, the desktop personal computer is abbreviated as a desktop PC).

Figure 1:
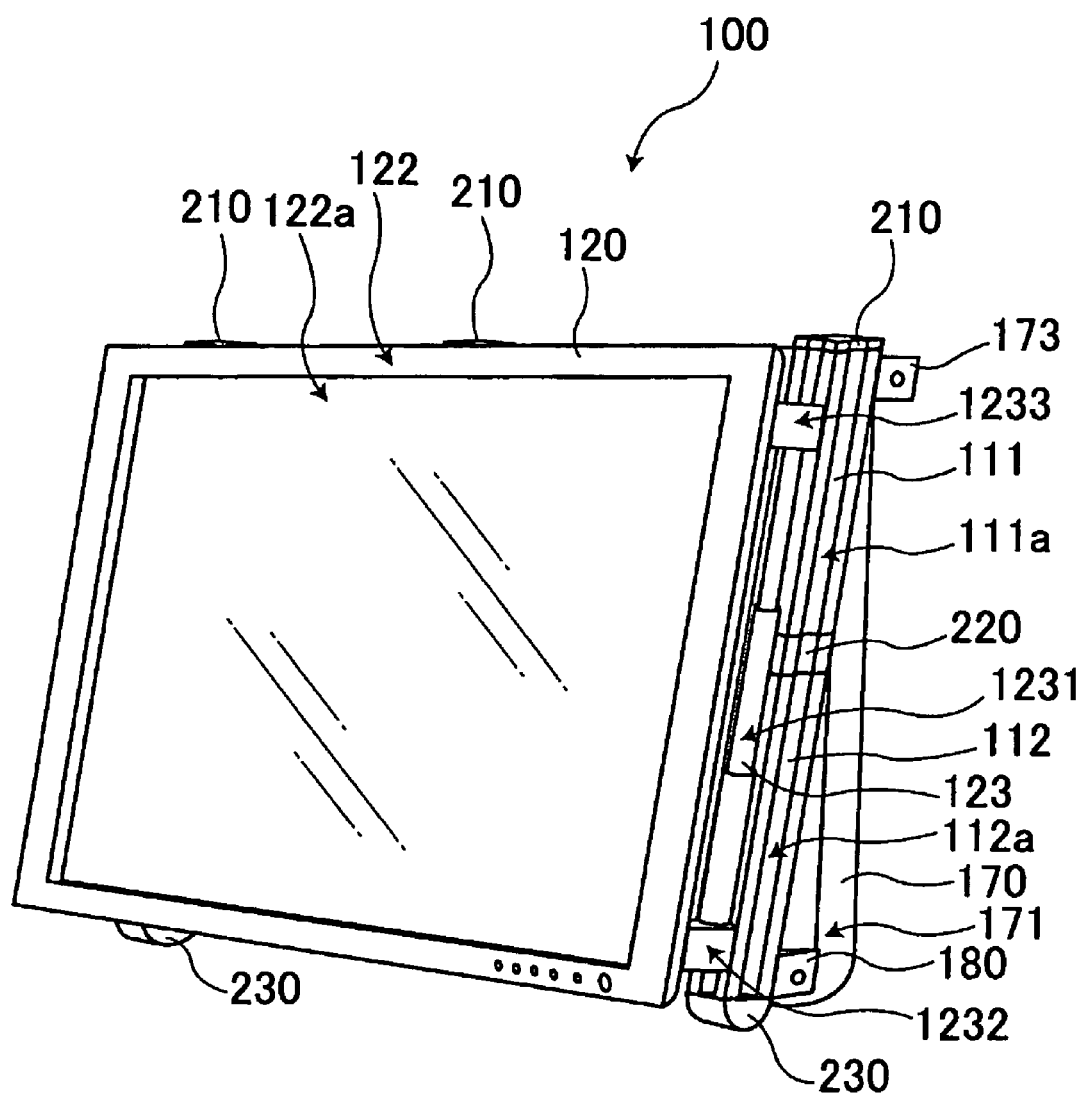
FIG. 1 is a front external perspective view of a desktop PC, laterally obliquely seen.
Figure 2:
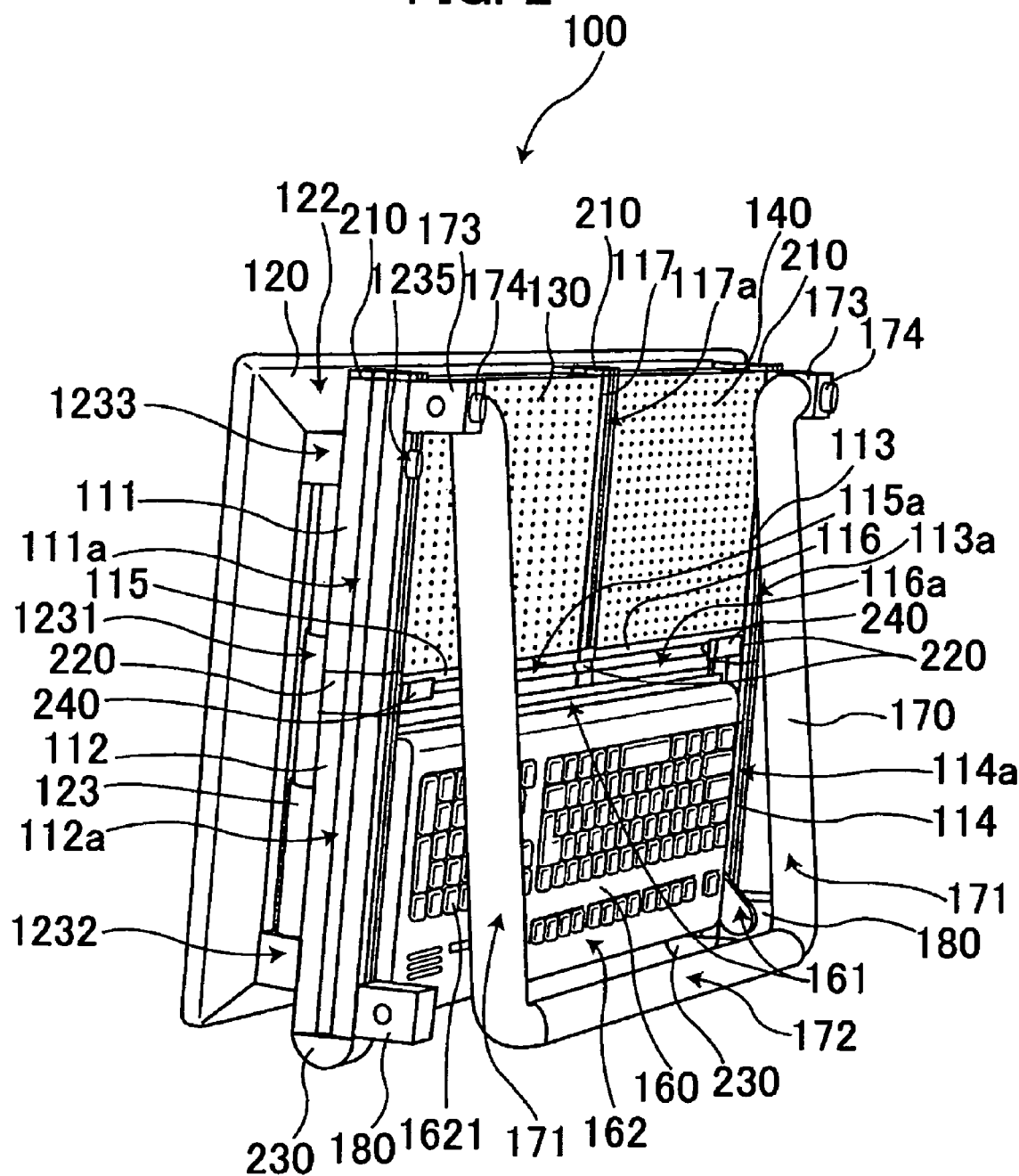
FIG. 2 is a rear external perspective view of the desktop PC illustrated in FIG. 1, laterally obliquely seen.
Figure 3:
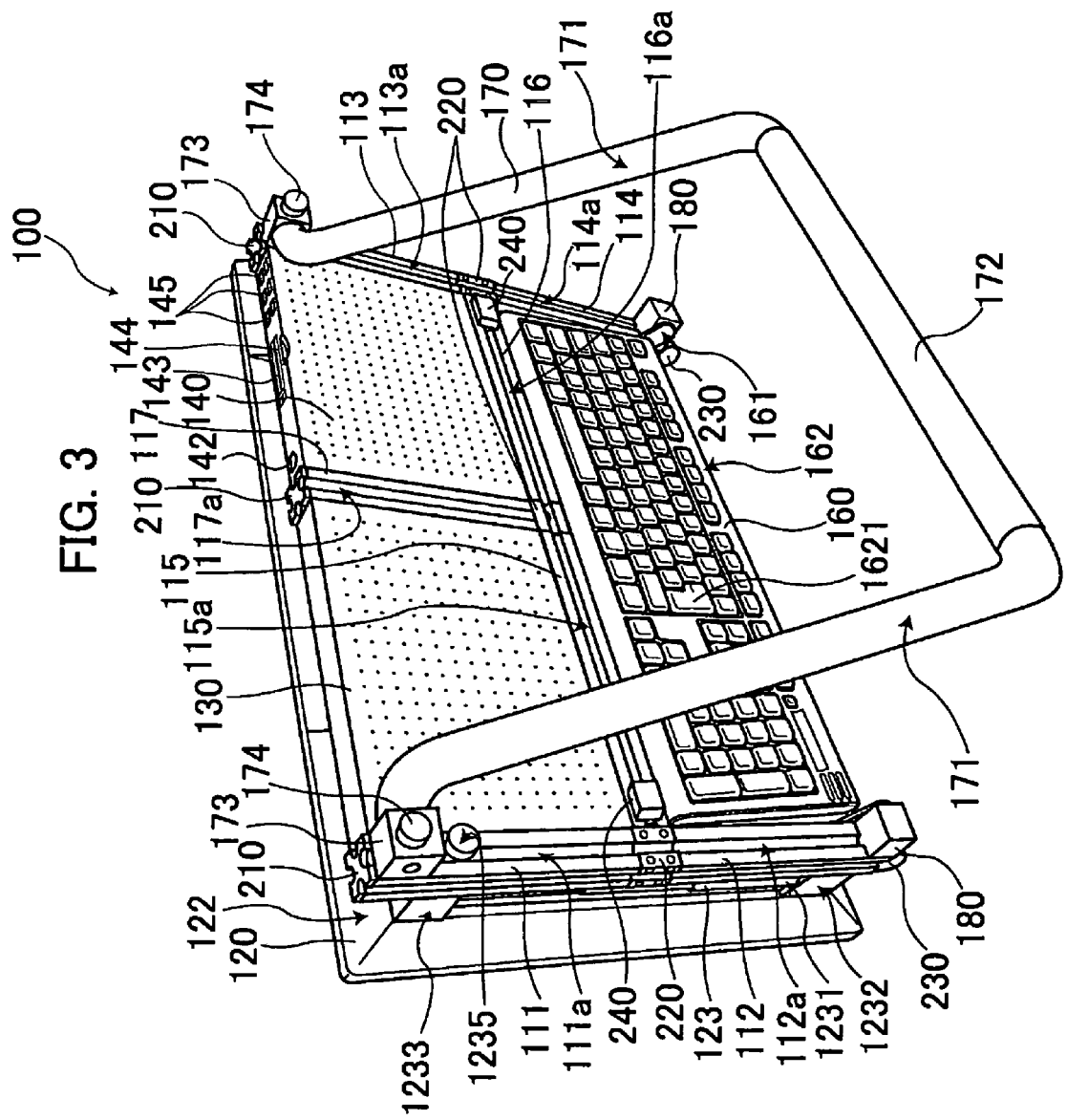
FIG. 3 is a rear external perspective view of the desktop PC in a using state in which a stand illustrated in FIG. 2 is opened at an angle of predetermined degrees, laterally obliquely seen.
Figure 4:
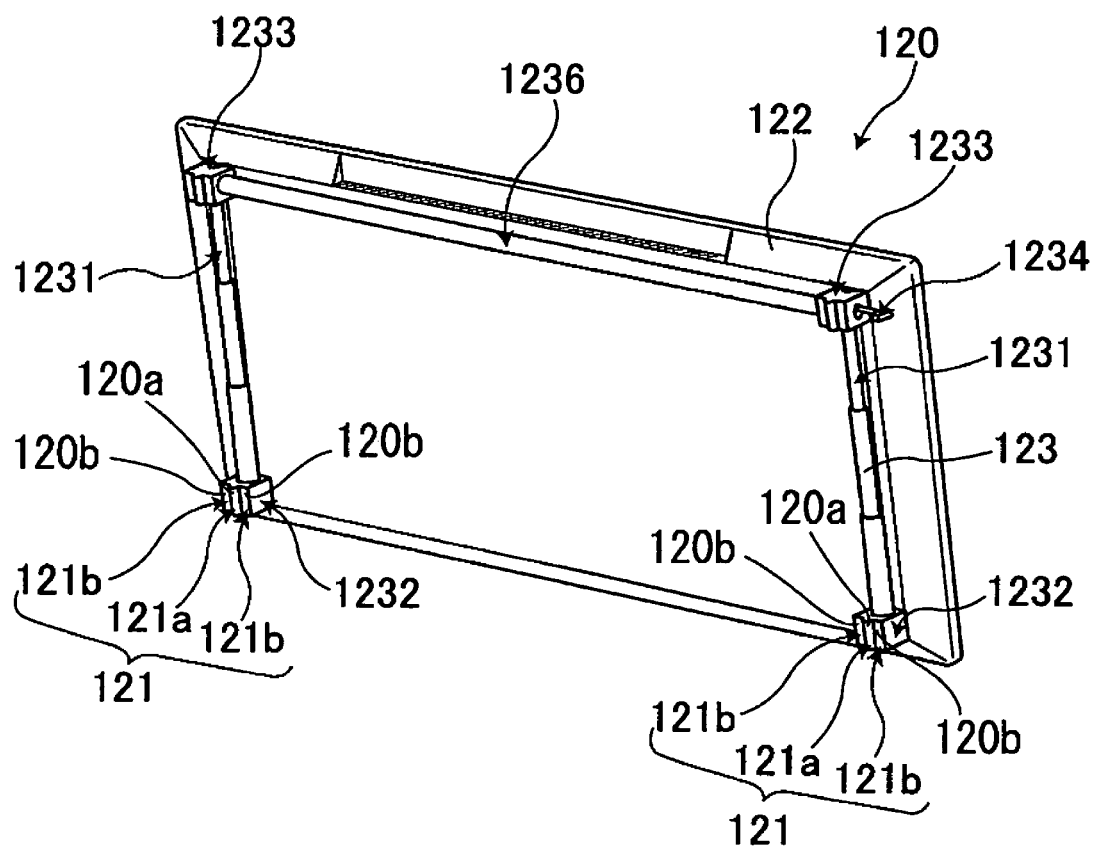
FIG. 4 is a rear external perspective view of an image display module illustrated in FIGS. 1 to 3, obliquely seen from above.
Figure 5:
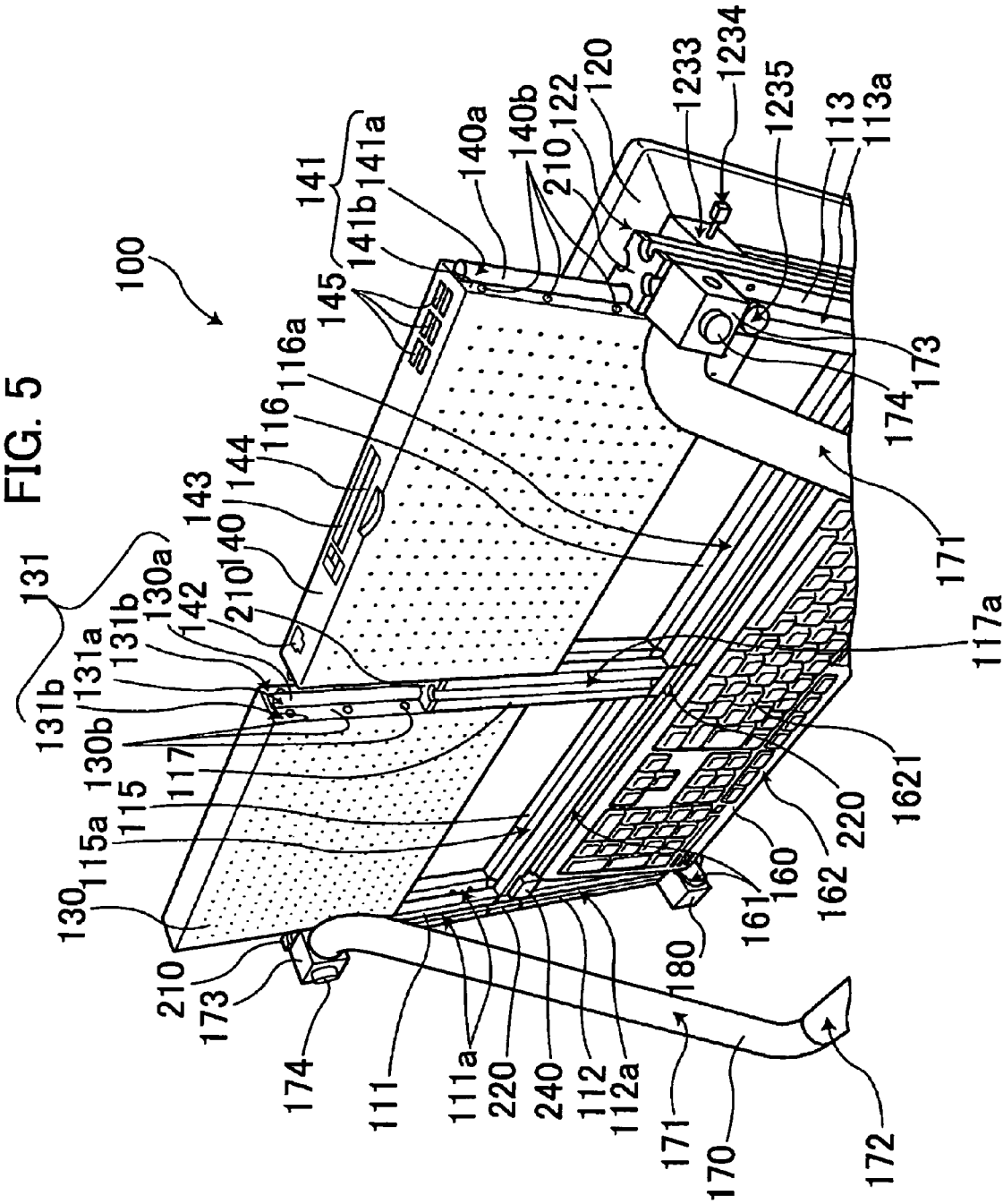
FIG. 5 is a rear external perspective view of the desktop PC in a state in which a main unit module and a connector module illustrated in FIGS. 2 and 3 are slid upward, laterally obliquely seen.
Figure 6:
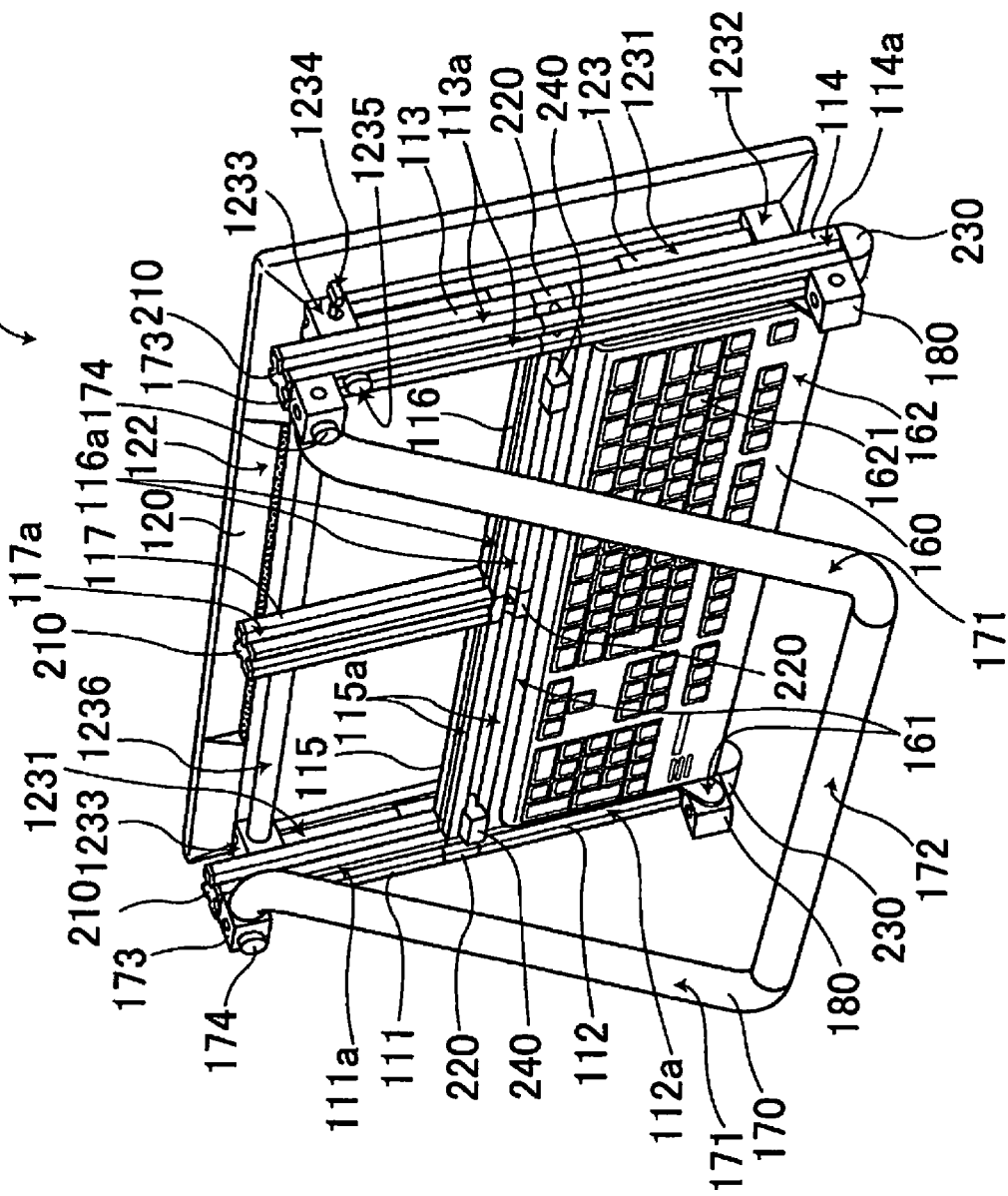
FIG. 6 is a rear external perspective view of the desktop PC in a state in which the main unit module and the connector module illustrated in FIG. 5 are further slid upward and detached, laterally obliquely seen.

FIG. 1 is a front external perspective view of a desktop PC 100, laterally obliquely seen; FIG. 2 is a rear external perspective view of the desktop PC 100 illustrated in FIG. 1, laterally obliquely seen; and FIG. 3 is a rear external perspective view of the desktop PC 100 in a using state in which a stand 170 illustrated in FIG. 2 is opened at an angle of predetermined degrees, laterally obliquely seen. FIG. 4 is a rear external perspective view of an image display module 120 illustrated in FIGS. 1 to 3, obliquely seen from above; FIG. 5 is a rear external perspective view of the desktop PC 100 in a state in which a main unit module 130 and a connector module 140 illustrated in FIGS. 2 and 3 are slid upward, laterally obliquely seen; and FIG. 6 is a rear external perspective view of the desktop PC 100 in a state in which the main unit module 130 and the connector module 140 illustrated in FIG. 5 are further slid upward and detached, laterally obliquely seen.

The desktop PC 100 illustrated in FIGS. 1 to 3 has processing ability similar to that of a general personal computer, and is provided with the hard disk device and the central processing unit (CPU) therein.

Also, the desktop PC 100 has grooves 111a, 112a, 113a, 114a, 115a, 116a and 117a extending in a longitudinal direction in appearance as illustrated in FIGS. 1 to 3, 5 and 6; seven frames 111, 112, 113, 114, 115, 116 and 117 having a bar-shape; and three joint parts 220 for coupling the frames 111, 112, 113, 114, 115, 116 and 117. Herein, six frames 111, 112, 113, 114, 115 and 116 out of the seven frames 111, 112, 113, 114, 115, 116 and 117 are coupled two by two by using the joint parts 220, and a pair of frames formed of two coupled frames 111 and 112 and two coupled frames 113 and 114 are vertically arranged so as to be parallel to each other with an interval therebetween, and the pair of frames are connected by two coupled frames 115 and 116 with the joint parts 220 respectively, and further, one remaining frame 117 is coupled to an intermediate upper portion between the pair of frames so as to be parallel thereto by using the joint part 220 coupling the frames 115 and 116.

Also, the desktop PC 100 is provided with the image display module 120 having a frame receiving section 121 detachably supported so as to be slidable up and down by the pair of frames formed of two coupled frames 111 and 112 and the two coupled frames 113 and 114 out of the seven frames 111, 112, 113, 114, 115, 116 and 117, as illustrated in FIGS. 1 to 6. Also, the main unit module 130 having a frame receiving section 131 detachably supported so as to be slidable up and down by the upper frame 111 of the two coupled frames 111 and 112 of one of the pair of frames and the remaining one frame 117 is included. Also, the connector module 140 having a frame receiving section 141 detachably supported so as to be slidable up and down by the upper frame 113 of the two coupled frames 113 and 114 of the other of the pair of frames and the remaining one frame 117 is included.

The image display module 120 includes a display panel 122 having a display screen 122a on the front, and an up-and-down motion mechanism 123 that allows the display panel 122 to move up and down relative to the pair of frames formed of the two coupled frames 111 and 112 and the two coupled frames 113 and 114, as illustrated in FIGS. 1 to 6.

The up-and-down motion mechanism 123 includes two up-and-down dampers 1231 that are extendable poles extending in an up-and-down direction for supporting the display panel 122 in a flexible extending state; first members 1232 fixed to lower ends of upper and lower ends of the two up-and-down dampers 1231 and fixed to a lower right end and a lower left end of a rear surface of the display panel 122 to be slidable up and down relative to the pair of frames; and second members 1233 fixed to upper ends of the upper and lower ends of the two up-and-down dampers 1231 and fixed to the upper ends of the pair of frames with bolts 1235 to be slidable up and down relative to the display panel 122.

Also, the two up-and-down dampers 1231 are such that the second members 1233 fixed to the upper ends are coupled by means of a hollow steel pipe 1236 as illustrated in FIGS. 4 and 6, and a wire (not illustrated) passes through the steel pipe 1236. A lever 1234 is provided on the second member 1233 fixed to the upper end of the up-and-down damper 1231, on a side in which the first member 1232 is fixed to the lower right end of the rear surface of the display panel 122, out of the two up-and-down dampers 1231. When the lever 1234 is operated, a pressure is applied to both of the up-and-down dampers 1231 through the wire in the steel pipe 1236, enabling the display panel 122 to move up and down relative to the pair of frames formed of the two coupled frames 111 and 112 and the two coupled frames 113 ad 114.

The display panel 122 is allowed to smoothly slide up and down by such up-and-down dampers 1231.

Also, as illustrated in FIG. 4, the first member 1232 has a protrusion 121a that slidably and detachably fits in the grooves 111a, 112a, 113a and 114a of the pair of frames formed of the two coupled frames 111 and 112 and the two coupled frames 113 and 114, and wall surfaces 121b on both sides of the protrusion 121a have shapes to abut wall surfaces on both sides of the grooves 111a, 112a, 113a and 114a of the frames 111, 112, 113 and 114, respectively. A combination of the protrusion 121a and the wall surfaces 121b is the frame receiving section 121 of the image display module 120. Also, the protrusion 121a of the frame receiving section 121 is provided with an image display module side power terminal 120a, which is supplied with electric power from the frames 111, 112, 113 and 114. Also, an image display module side signal terminal 120b, which transmits a signal between the image display module 120 and the outside, is provided on the wall surface 121b of the frame receiving section 121. Therefore, since the frame receiving section 121 is surely supported by the frames 111, 112, 113 and 114, the image display module side power terminal 120a and a frame side power terminal 1111 (refer to FIG. 7) are surely connected, and the image display module side signal terminal 120b and a frame side signal terminal 1112 are also surely connected (refer to FIG. 7).

The main unit module 130 is the module incorporating a circuit board on which a CPU for executing a program and an electronic circuit is mounted, and a hard disk in which information is stored. The main unit module 130 has protrusions 131a that slidably and detachably fit in the grooves 111a and 117a of the frames 111 and 117, respectively, on both right and left side surfaces of the main unit module 130, and wall surfaces 131b on both sides of the protrusion 131a have shapes to abut wall surfaces on both sides of the grooves 111a and 117a of the frames 111 and 117, respectively, as illustrated in FIG. 5. A combination of the protrusion 131a and the wall surfaces 131b is the frame receiving section 131 of the main unit module 130. Also, the protrusion 131a of the frame receiving section 131 is provided with a main unit module side power terminal 130a, which is supplied with the electric power from the frames 111 and 117. Also, the wall surface 131b of the frame receiving section 131 is provided with a main unit module side signal terminal 130b, which transmits the signal between the main unit module 130 and the outside. Therefore, since the frame receiving section 131 is surely supported by the frames 111 and 117, the main unit module side power terminal 130a and the frame side power terminal 1111 (refer to FIG. 7) are surely connected, and a main unit module side signal terminal 130b and the frame side signal terminal 1112 are also surely connected (refer to FIG. 7).

The connector module 140 is the module provided with a data communication connector 142 to which a communication cable (not illustrated) for data communication is connected, a media slot 143 to which a recording medium (not illustrated) is removably inserted, a PC card slot 144 to which a PC card (not illustrated) is removably inserted, and a USB (Universal Serial Bus) connector 145 to which a USB cable (not illustrated) is connected. The connector module 140 has protrusions 141a, which slidably and detachably fit in the grooves 113a and 117a of the frames 113 and 117, respectively, on both right and left side surfaces of the connector module 140, and wall surfaces 141b on both sides of the protrusion 141a have shapes to abut wall surface on both sides of the grooves 113a and 117a of the frames 113 and 117, respectively, as illustrated in FIG. 5. A combination of the protrusion 141a and the wall surface 141b is the frame receiving section 141 of the connector module 140. Also, the protrusion 141a of the frame receiving section 141 is provided with a connector module side power terminal 140a, which is supplied with the electric power from the frames 113 and 117. Also, the wall surface 141b of the frame receiving section 141 is provided with a connector module side signal terminal 140b, which transmits the signal between the connector module 140 and the outside. Therefore, since the frame receiving section 141 is surely supported by the frames 113 and 117, the connector module side power terminal 140a and the frame side power terminal 1111 (refer to FIG. 7) are surely connected, and the connector module side signal terminal 140b and the frame side signal terminal 1112 (refer to FIG. 7) are also surely connected.

Figure 7:
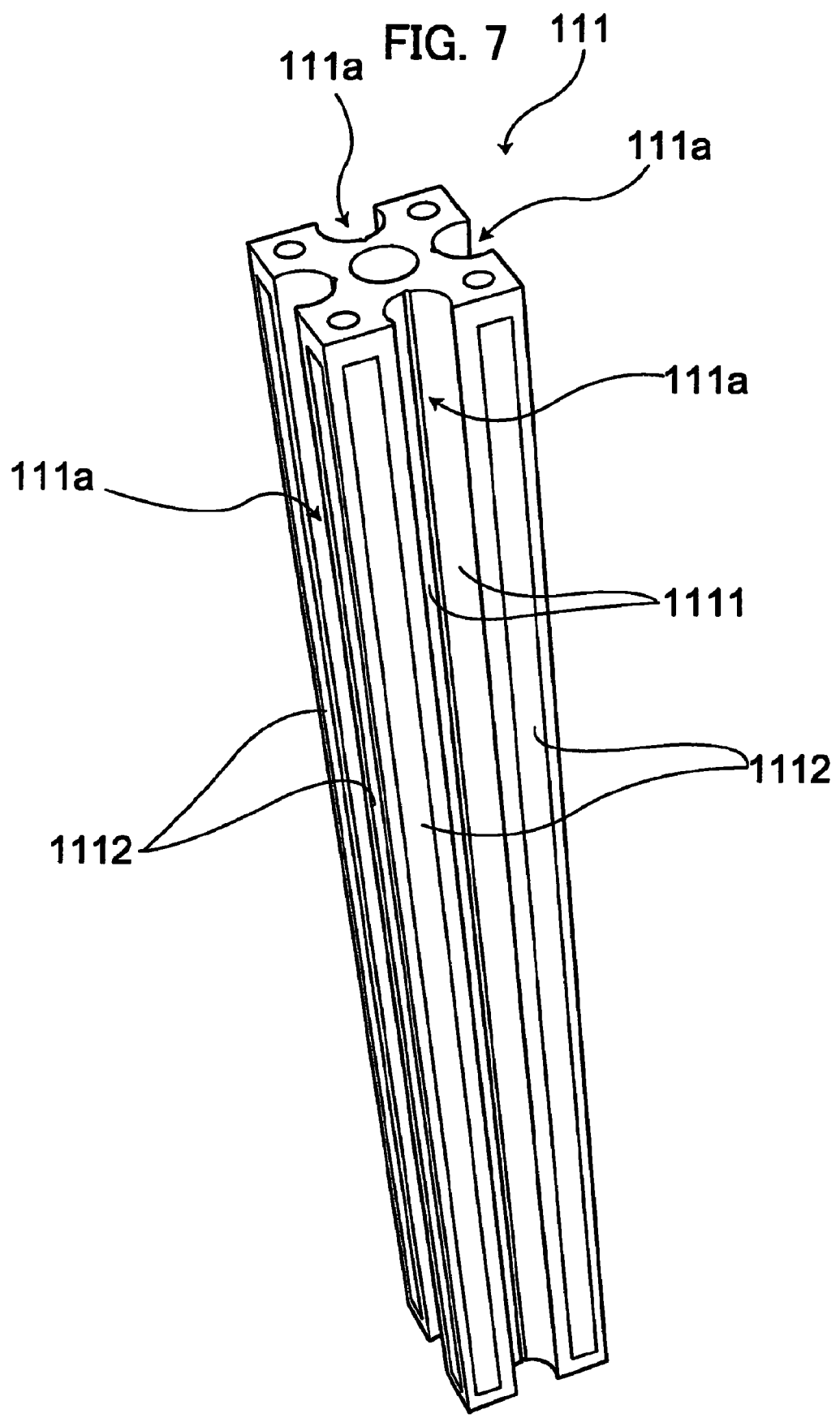
FIG. 7 is an enlarged view of the frame illustrated in FIGS. 1 to 6.

FIG. 7 is an enlarged view of the frame 111 illustrated in FIGS. 1 to 6, and FIG. 8 is an enlarged view of the joint part 220 illustrated in FIGS. 1 to 6, and the frame 111 is provided with the frame side power terminal 1111, which supplies the electric power to the image display module side power terminal 120a (refer to FIG. 4), the main unit module side power terminal 130a (refer to FIG. 5) and the connector module side power terminal 140a (refer to FIG. 5) in a state in which the frame receiving section 121 of the image display module 120 (refer to FIG. 4), the frame receiving section 131 of the main unit module 130 (refer to FIG. 5) and the frame receiving section 141 of the connector module 140 (refer to FIG. 5) are supported by the frame 111, on the groove 111a portion of the frame 111, as illustrated in FIG. 7.

Also, the frame 111 is provided with the frame side signal terminals 1112, which relay the signal transmitted between each module of the image display module side signal terminal 120b (refer to FIG. 4), the main unit module side signal terminal 130b (refer to FIG. 5) and the connector module side signal terminal 140b (refer to FIG. 5) and between each module and the outside, on the wall surface portions on both sides of the groove 111a of the frame 111 as illustrated in FIG. 7.

Meanwhile, although other frames 112, 113, 114, 115, 116 and 117 illustrated in FIGS. 1 to 6 are also provided with the frame side power terminal 1111 and the frame side signal terminals 1112, as in the case of the frame 111 illustrated in FIG. 7, they are not herein illustrated.

Figure 8:
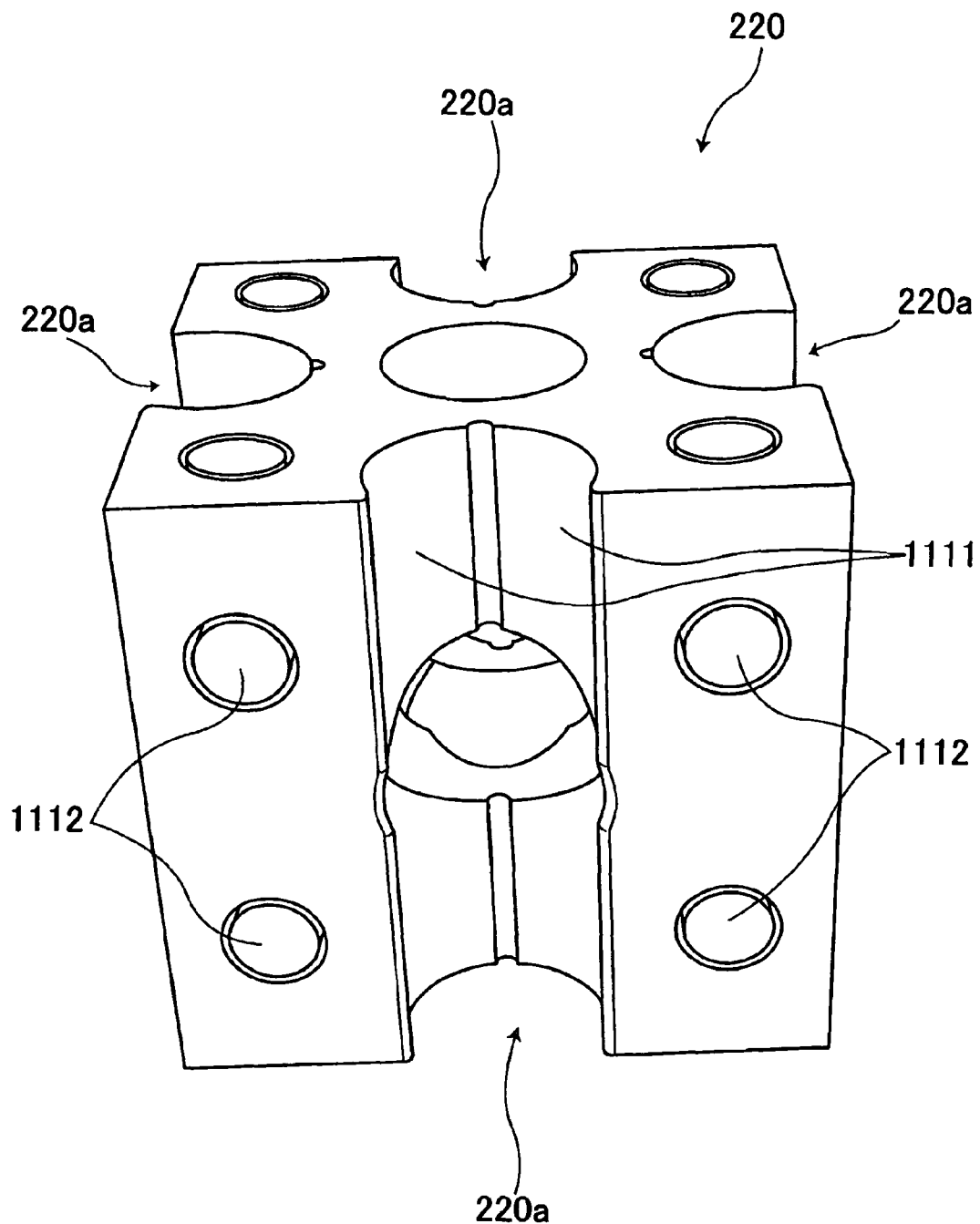
FIG. 8 is a joint part illustrated in FIGS. 1 to 6.

Also, the joint part 220 has a groove 220a as illustrated in FIG. 8, and the frame side power terminal 1111 is provided on the groove 220a portion. Also, the frame side signal terminals 1112 are provided on the wall surface portions on both sides of the groove 220a.

In this manner, the image display module side power terminal 120a, the main unit module side power terminal 130a and the connector module side power terminal 140a in a state in which the frame receiving section 121 of the image display module 120 (refer to FIG. 4), the frame receiving section 131 of the main unit module 130 (refer to FIG. 5) and the frame receiving section 141 of the connector module 140 (refer to FIG. 5) are supported by the frames 111, 112, 113, 114, 115, 116 and 117, are supplied with the electric power from the frame side power terminal 1111 provided on the frames 111, 112, 113, 114, 115, 116 and 117 and the joint parts 220. Therefore, it is not necessary to connect the power cable for supplying the electric power to the image display module 120, the main unit module 130 and the connector module 140, so that trouble of connection and handling of the power cable may be avoided.

Also, it is not necessary to connect the signal transmission cable to each module when realizing the transmission of the signal between each module and between each module and the outside, so that trouble of connection and handling of the signal transmission cable may be avoided.

Figure 9:
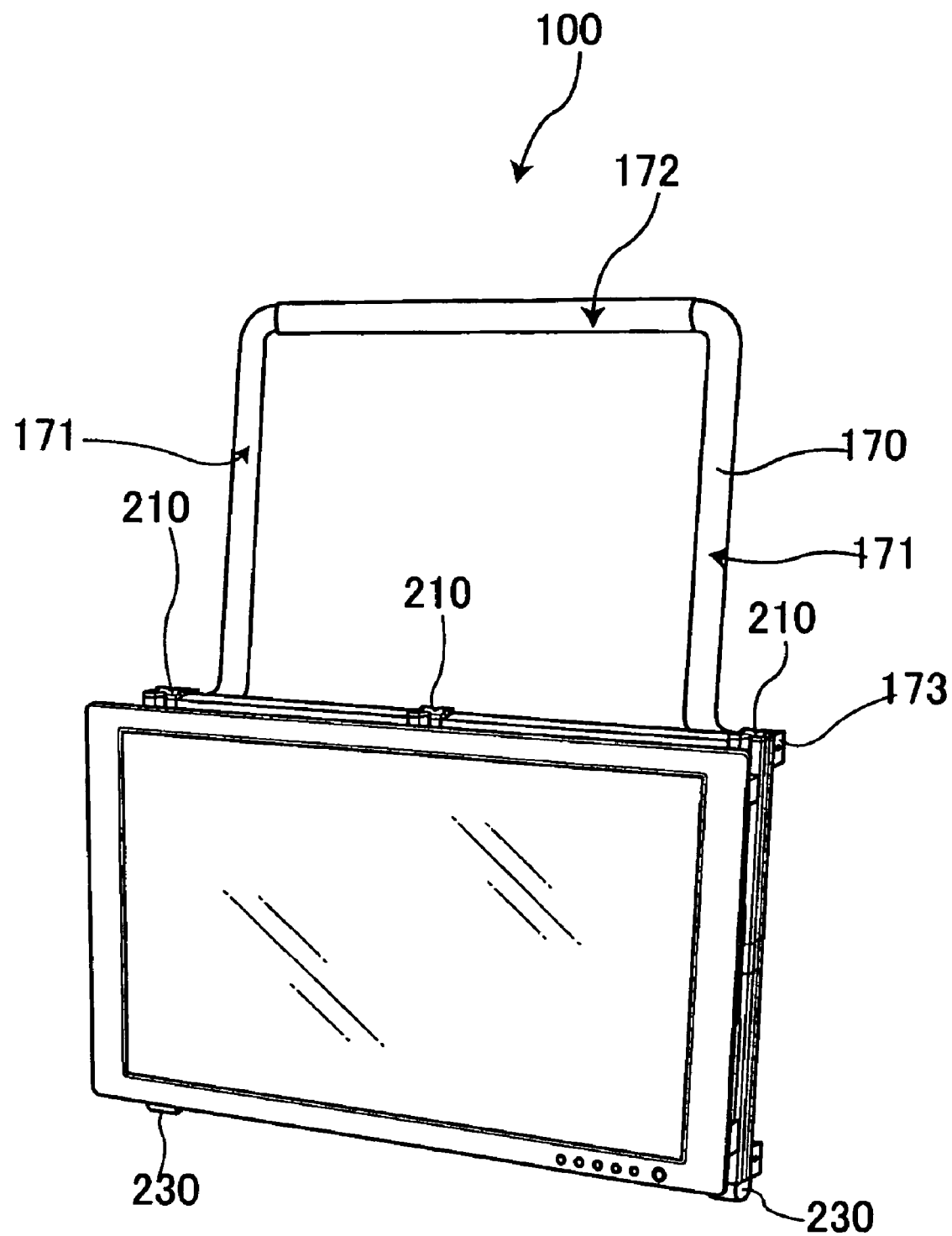
FIG. 9 is a rear external perspective view of the desktop PC in an opened state in which the stand illustrated in FIGS. 1 to 3 is opened at an angle of approximately 180 degrees from a folding state, laterally obliquely seen.
Figure 10:
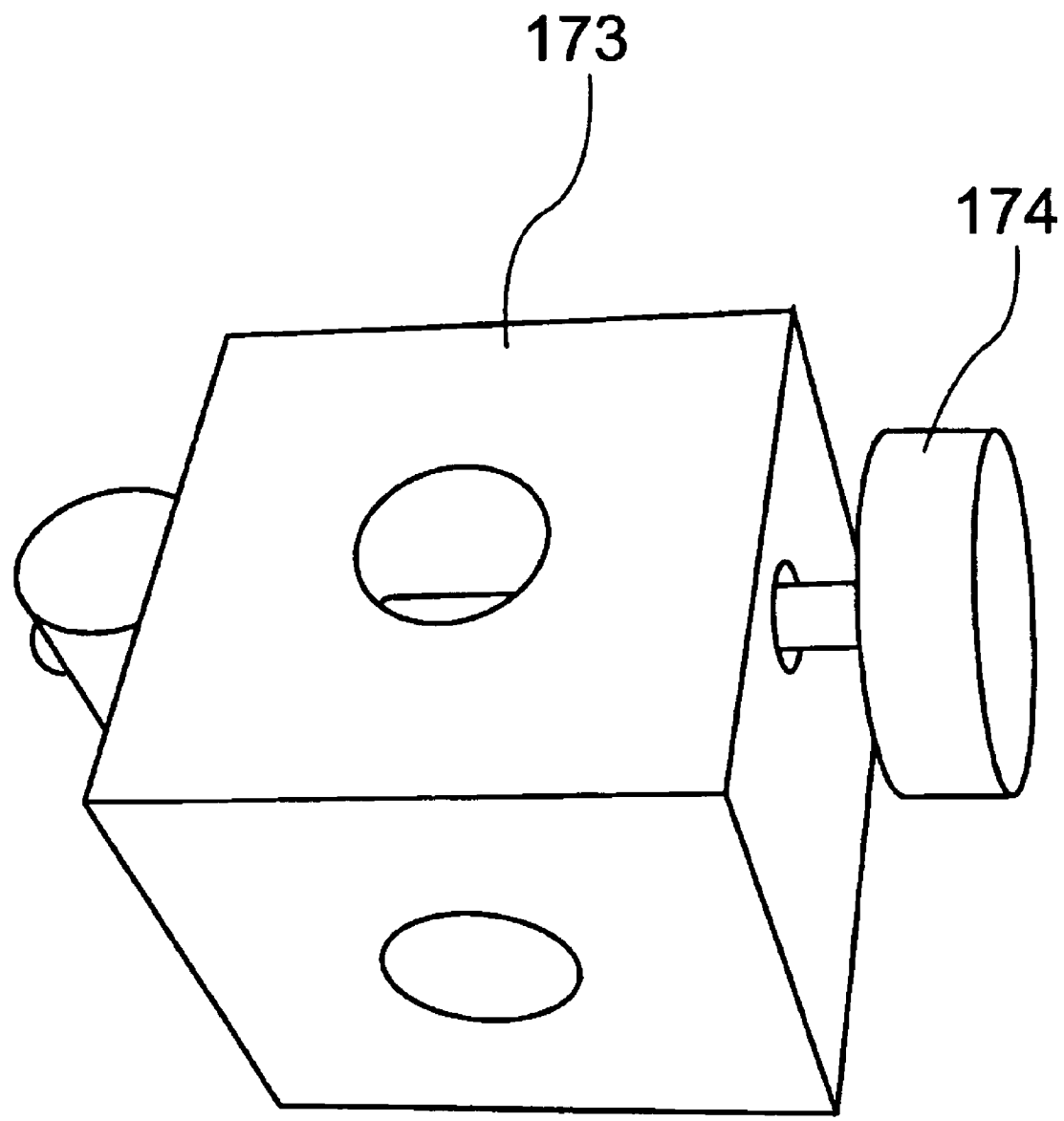
FIG. 10 is an enlarged view of an arm section supporting member 173 a bolt illustrated in FIGS. 1 to 3, 5, 6 and 9.

FIG. 9 is a rear external perspective view of the desktop PC 100 in an opened state in which the stand 170 illustrated in FIGS. 1 to 3 is opened at an angle of approximately 180 degrees from a folding state, laterally obliquely seen. Also, FIG. 10 is an enlarged view of an arm section supporting member 173 and a bolt 174 illustrated in FIGS. 1 to 3, 5, 6 and 9.

The desktop PC 100 is provided with the stand 170 having a pair of arm sections 171 of which one ends are rotatably supported on upper portions of the pair of frames formed of the two coupled frames 111 and 112 and the two coupled frames 113 and 114 when the image display module 120 is stood by means of the arm section supporting member 173 fixed with the bolt 174; and a rod section 172 for connecting the other ends of the pair of arm sections 171, as illustrated in FIGS. 1 to 3, 5, 6, 9 and 10.

Also, the stand 170 is rotatable among a folded state illustrated in FIGS. 1 and 2 in which the stand 170 is overlapped with the image display module 120, the using state illustrated in FIG. 3 in which the stand 170 is opened at an angle of predetermined degrees from the image display module 120 and is used as the stand to obliquely stand the image display module 120, and the opened state illustrated in FIG. 9 in which the stand 170 is opened at an angle of approximately 180 degrees from the folded state and is used as a handle when carrying the image display module 120.

In this manner, since the stand 170 may be folded, used as the stand to obliquely stand the desktop PC 100, and used as the handle when carrying the desktop PC 100, so that the number of components and the number of assembling steps are reduced relative to those of a conventional electronic device including the handle and the stand as separate components, and a manufacturing cost thereof is reduced.

Also, according to the stand 170, a load relative to the display panel 122 of the image display module 120 when using the stand 170 as the handle when carrying the desktop PC 100 is distributed in comparison to a structure in which the pair of arm sections are directly pivotally supported by the image display module 120.

Also, the desktop PC 100 is provided with a nonslip rubber 230 illustrated in FIGS. 1 to 3, 5, 6 and 9. Herein, the nonslip rubbers 230 are provided on lower ends of the pair of frames formed of the two coupled frames 111 and 112 and the two coupled frames 113 and 114, and a state in which the desktop PC 100 is obliquely stood is stably maintained in the using state illustrated in FIG. 3.

Figure 11:
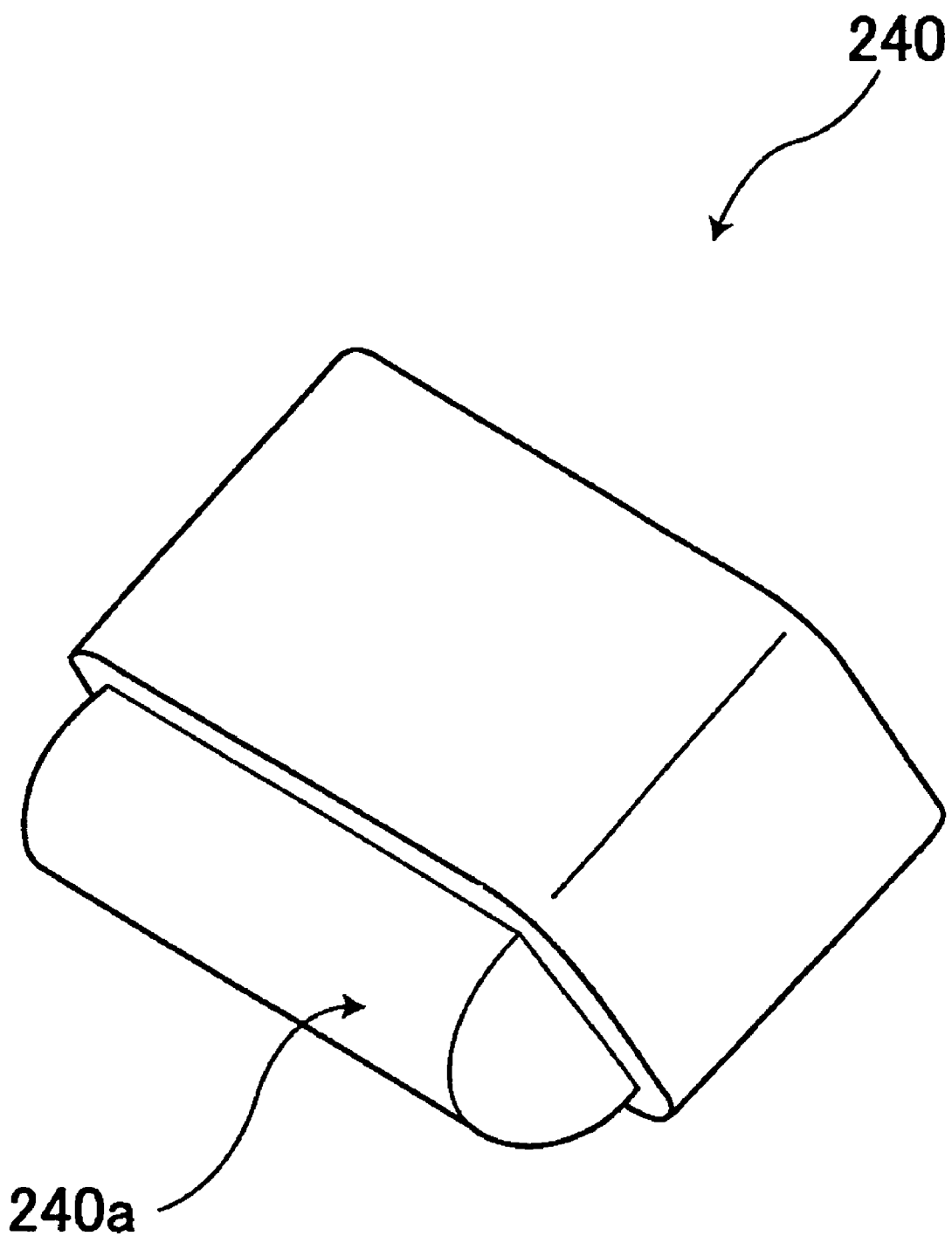
FIG. 11 is an enlarged view of a handle stopper rubber illustrated in FIGS. 2, 3, 5 and 6.
Figure 12:
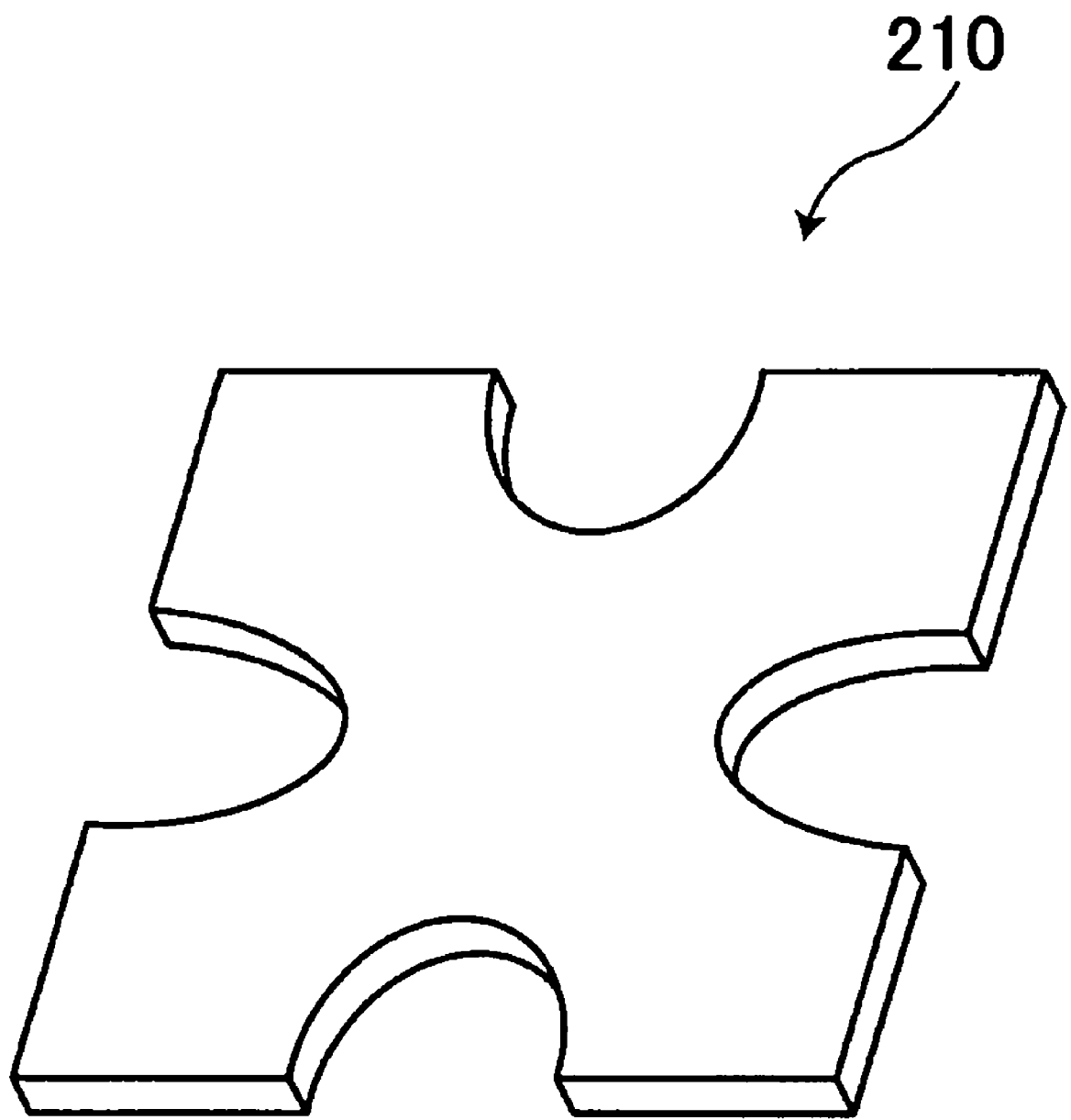
FIG. 12 is an enlarged view of a cap illustrated in FIGS. 1 to 3, 5, 6 and 9.

FIG. 11 is an enlarged view of a handle stopper rubber 240 illustrated in FIGS. 2, 3, 5 and 6, and FIG. 12 is an enlarged view of a cap 210 illustrated in FIGS. 1 to 3, 5, 6 and 9.

The desktop PC 100 is provided with the handle stopper rubber 240 illustrated in FIGS. 2, 3, 5, 6 and 11. The handle stopper rubber 240 is made of an elastic material having a convex stripe 240a, which detachably fits in the grooves 111a, 112a, 113a, 114a, 115a, 116a and 117a formed on the frames 111, 112, 113, 114, 115, 116 and 117, respectively. Herein, the handle stopper rubbers 240 are provided on both right and left ends of the two coupled frames 115 and 116 connected between the pair of frames by using the joint parts 220 in the pair of frames formed of the two coupled frames 111 and 112 and the two coupled frames 113 and 114.

Such handle stopper rubber 240 prevents the stand 170 from colliding with the device in the folded state illustrated in FIGS. 1 and 2.

Also, the desktop PC 100 is provided with the cap 210 illustrated in FIGS. 1 to 3, 5, 6, 9 and 12. The cap 210 is formed of an elastic material, which fits in the ends of the frames 111, 112, 113, 114, 115, 116 and 117. Herein, the caps 210 fit in the upper ends of the frames 111, 113 and 117 of which ends are exposed.

The cap 210 prevents the user from being injured by touching the ends of the frames 111, 113 and 117.

Figure 13:
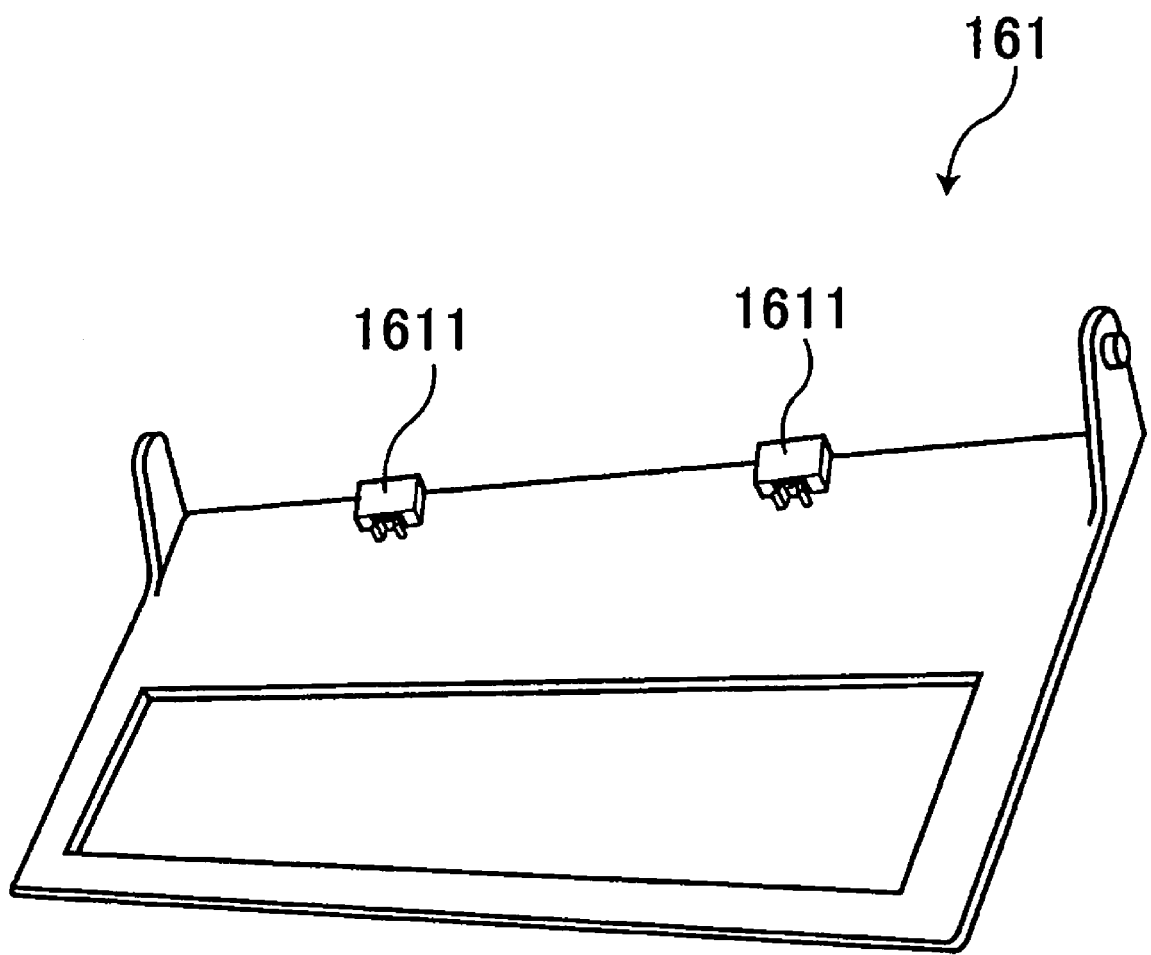
FIG. 13 is an enlarged view of a keyboard stage illustrated in FIGS. 2, 3, 5 and 6.
Figure 14:
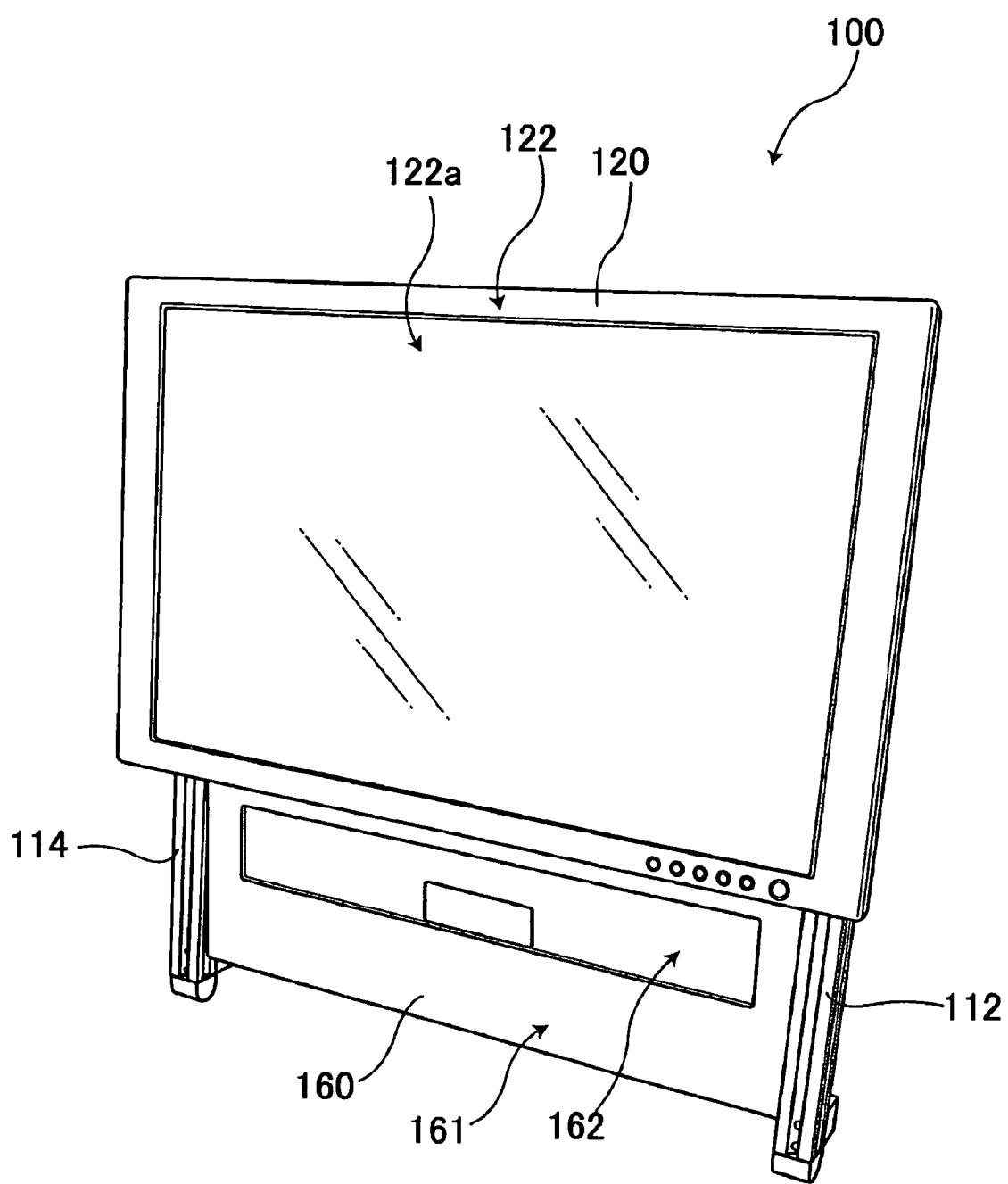
FIG. 14 is a front external perspective view of the desktop PC in a state in which the image display module is slid upward, laterally obliquely seen.
Figure 15:
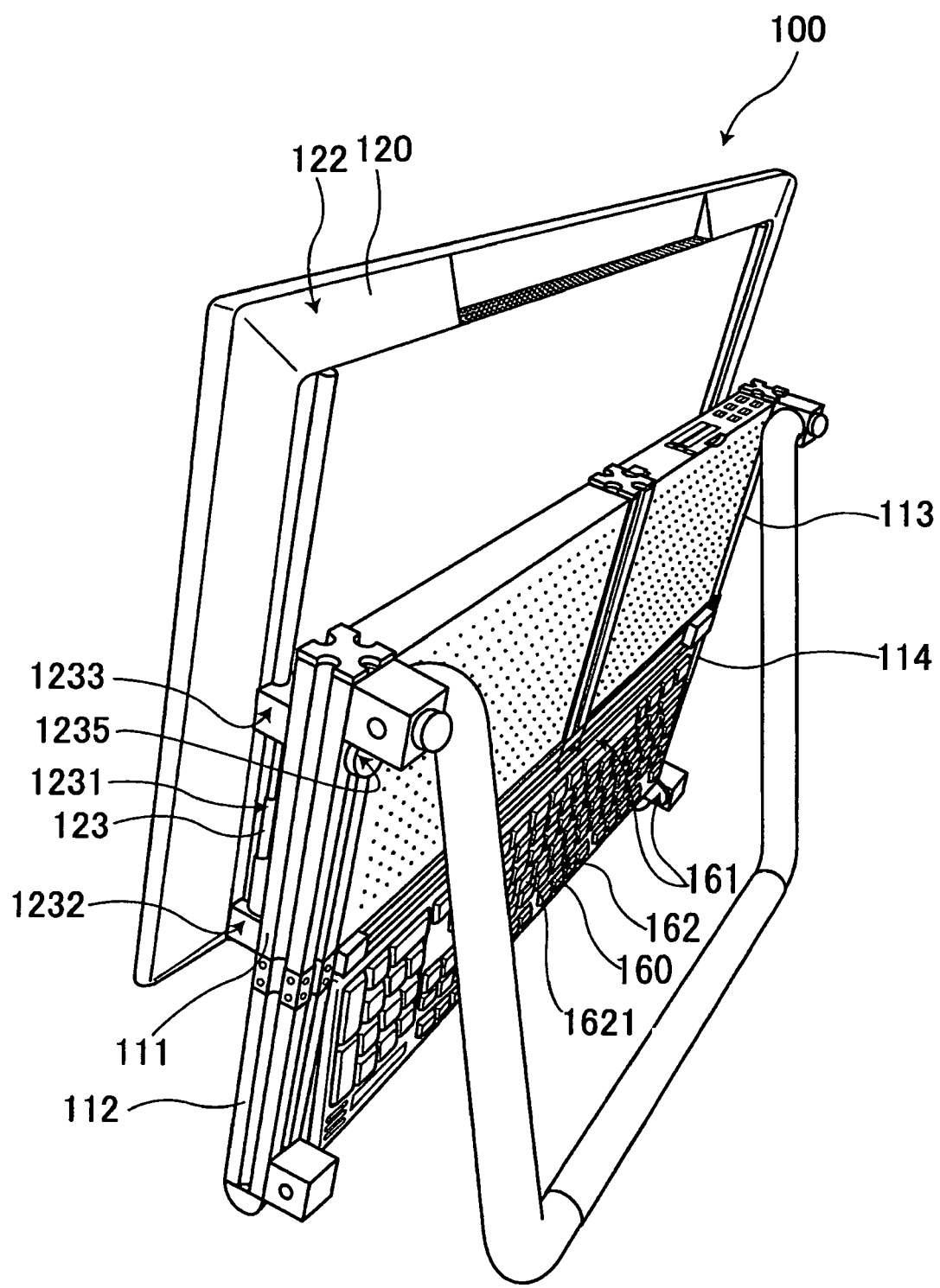
FIG. 15 is a rear external perspective view of the desktop PC in the state illustrated in FIG. 14, obliquely seen from above.
Figure 16:
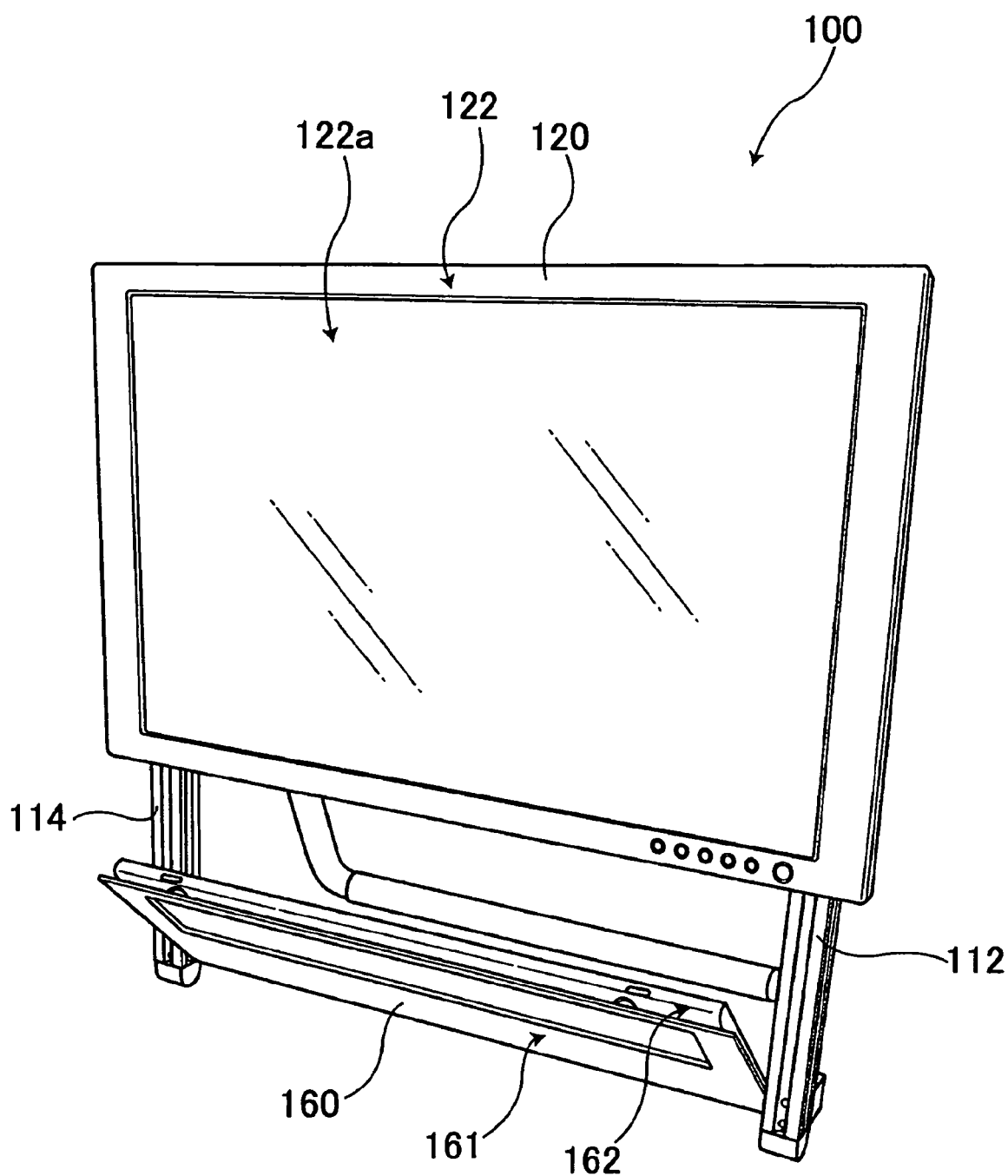
FIG. 16 is a front external perspective view of the desktop PC in a state of rotating the keyboard module, laterally obliquely seen.
Figure 17:
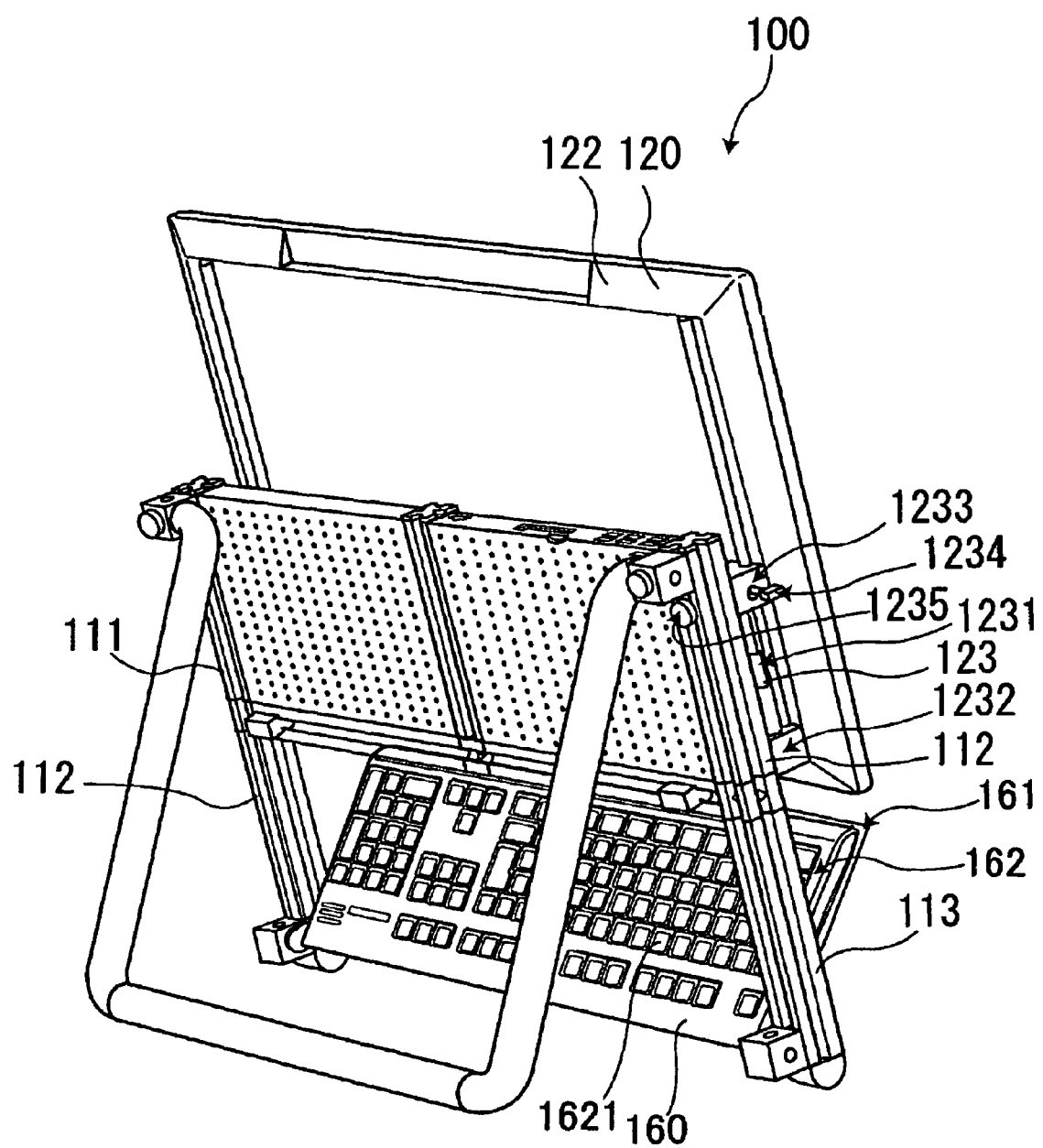
FIG. 17 is a rear external perspective view of the desktop PC in the state illustrated in FIG. 16, obliquely seen from above.
Figure 18:
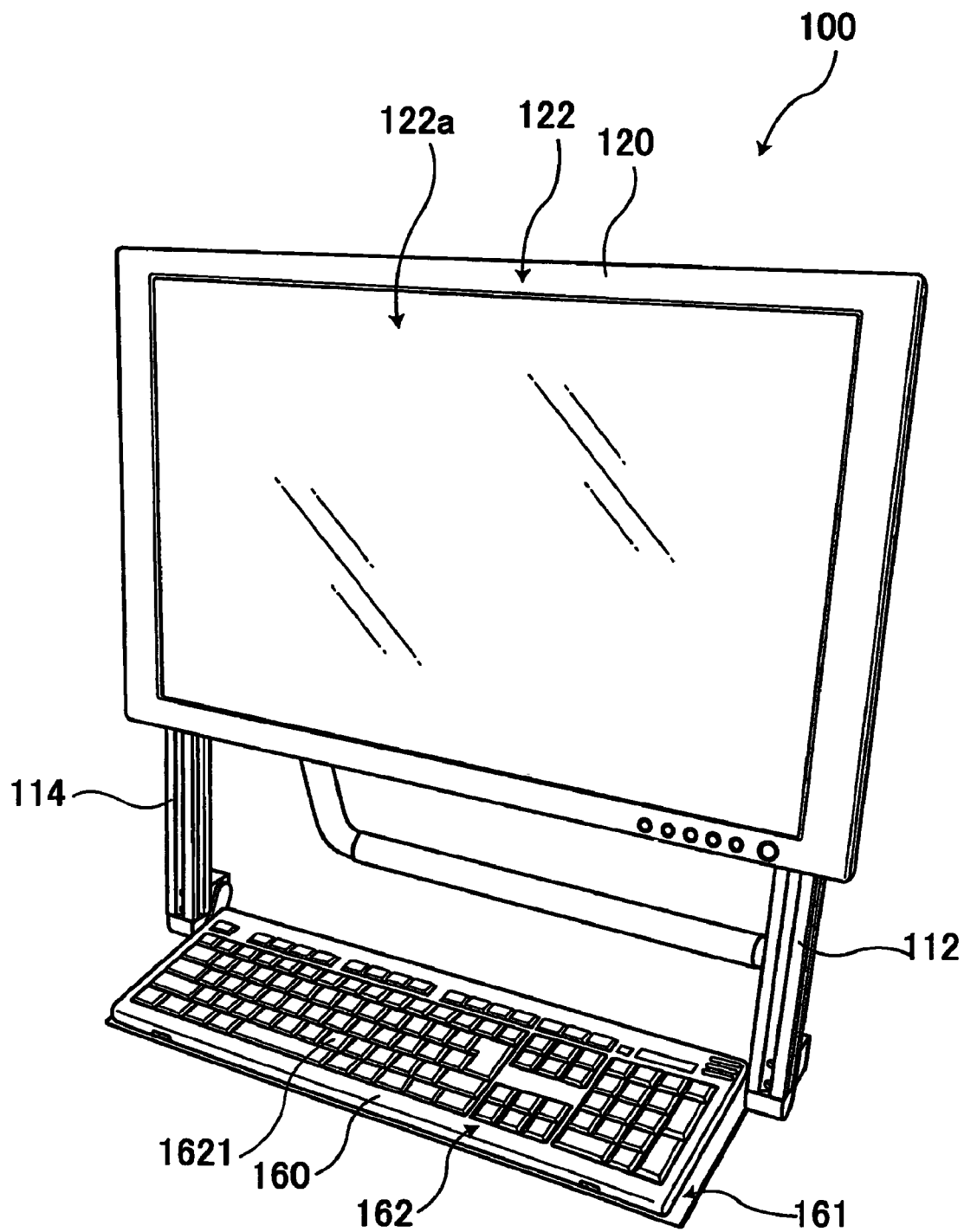
FIG. 18 is a front external perspective view of the desktop PC in the using state in which operational keys of the keyboard module are on a top surface, laterally obliquely seen.
Figure 19:
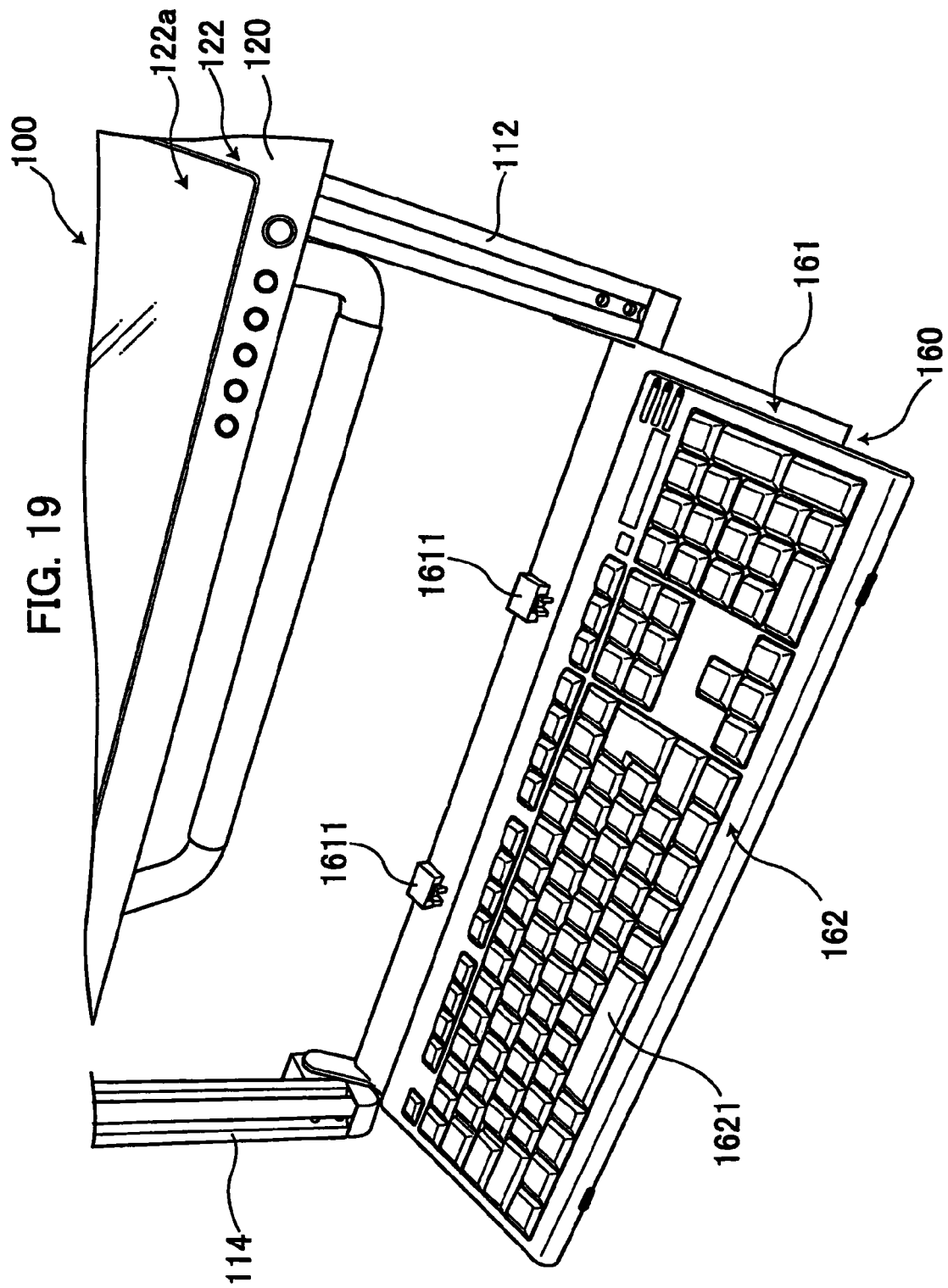
FIG. 19 is an external perspective view of the keyboard in which lock by a latch mechanism of the keyboard stage is released.
Figure 20:
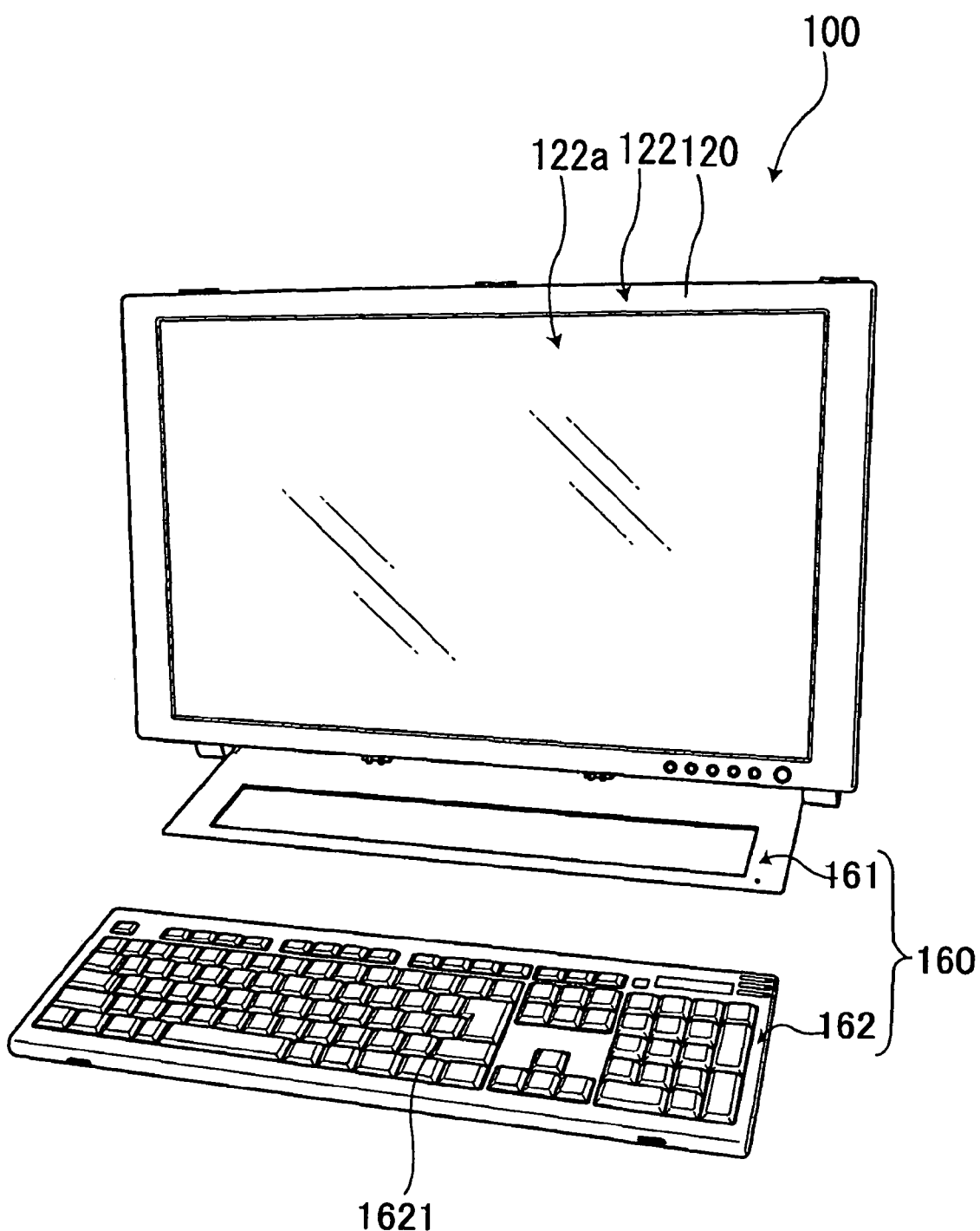
FIG. 20 is a front external perspective view of the desktop PC in a state in which the image display module is slid downward when the keyboard stage is in the using state, laterally obliquely seen.
Figure 21:
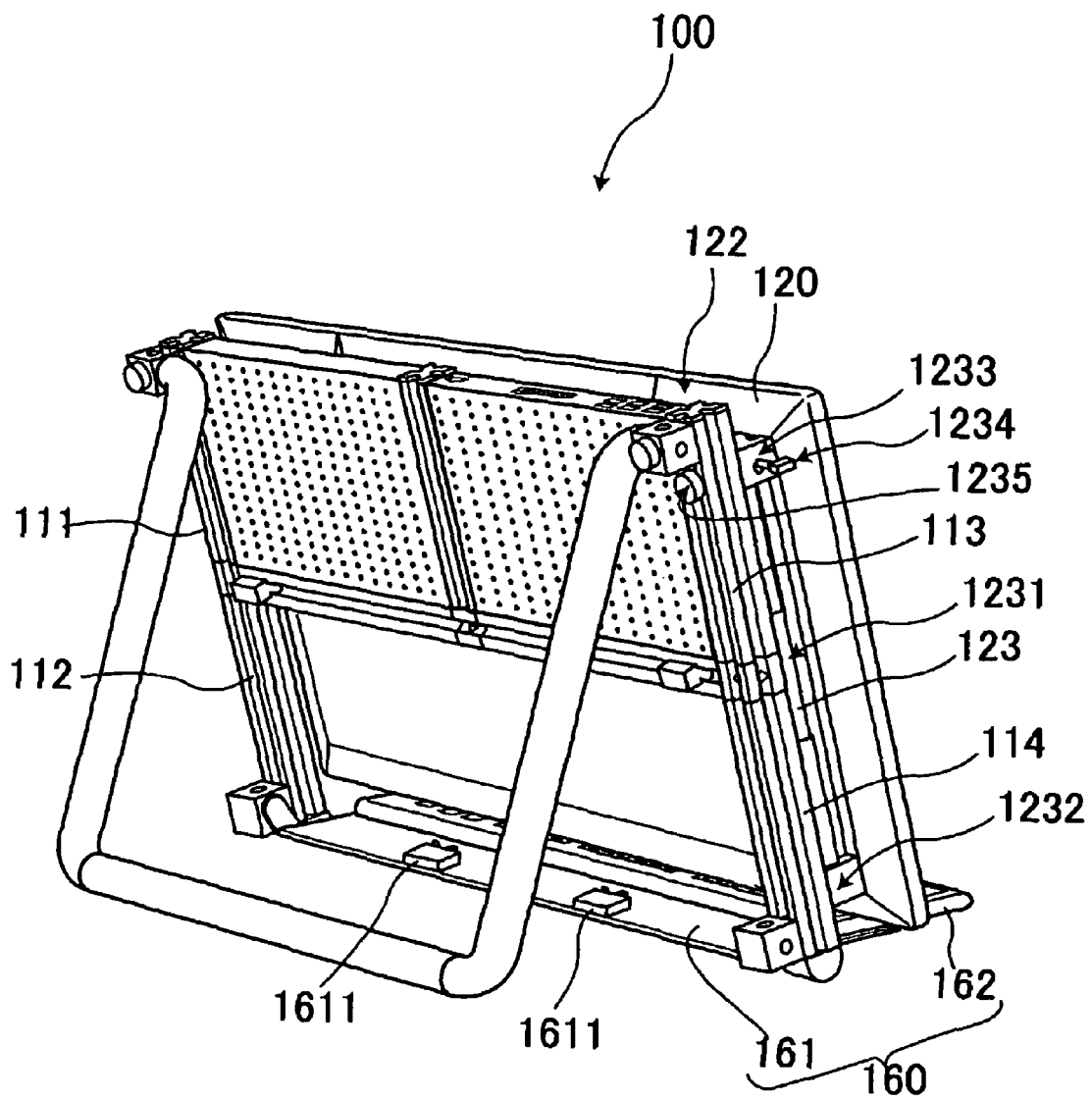
FIG. 21 is a rear external perspective view of the desktop PC in the state illustrated in FIG. 20, obliquely seen from above.
Figure 22:
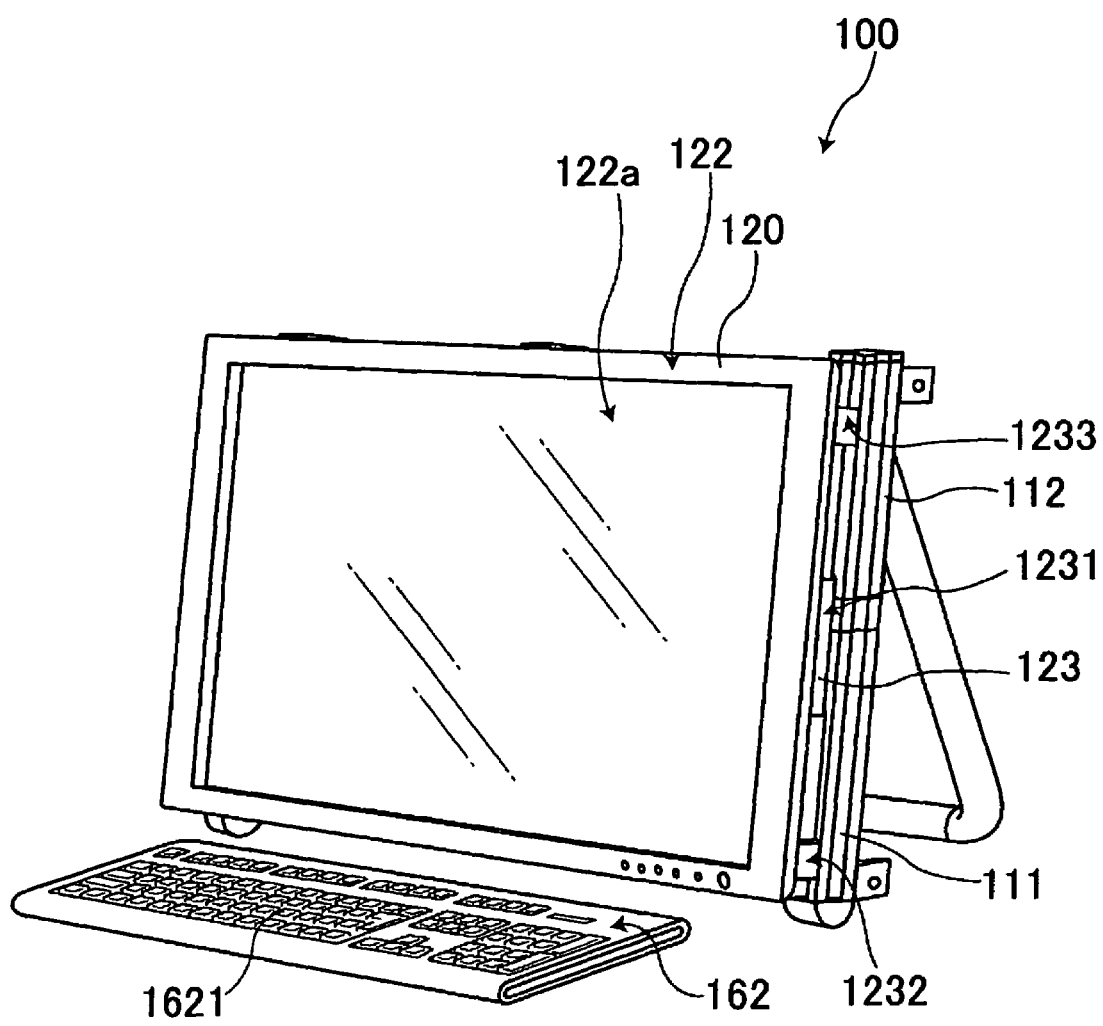
FIG. 22 is a front external perspective view of the desktop PC in a state in which the image display module is slid downward when the keyboard stage is in a stowed state, laterally obliquely seen.

FIG. 13 is an enlarged view of a keyboard stage 161 illustrated in FIGS. 2, 3, 5 and 6. Also, FIG. 14 is a front external perspective view of the desktop PC 100 in a state in which the image display module 120 is slid upward, laterally obliquely seen; and FIG. 15 is a rear external perspective view of the desktop PC 100 in the state illustrated in FIG. 14, obliquely seen from above. Also, FIG. 16 is a front external perspective view of the desktop PC 100 in a state of rotating the keyboard module 160, laterally obliquely seen; and FIG. 17 is a rear external perspective view of the desktop PC 100 in the state illustrated in FIG. 16, obliquely seen from above. FIG. 18 is a front external perspective view of the desktop PC 100 in the using state in which operational keys 1621 of the keyboard module 160 are on a top surface, laterally obliquely seen. FIG. 19 is an external perspective view of the keyboard 162 in which lock by a latch mechanism 1611 of the keyboard stage 161 is released. In addition, FIG. 20 is a front external perspective view of the desktop PC 100 in a state in which the image display module 120 is slid downward when the keyboard stage is in the using state, laterally obliquely seen; and FIG. 21 is a rear external perspective view of the desktop PC 100 in the state illustrated in FIG. 20, obliquely seen from above. Also, FIG. 22 is a front external perspective view of the desktop PC 100 in a state in which the image display module 120 is slid downward when the keyboard stage 161 is in a stowed state, laterally obliquely seen.

The desktop PC 100 is provided with the keyboard module 160 in which the operational keys 1621 are arranged as illustrated in FIGS. 2, 3, 5, 6 and 14 to 22.

The keyboard module 160 includes the keyboard stage 161 rotatably supported by a supporting member 180 formed of a pair of supporting pieces supported on lower sides of the pair of frames formed of the two coupled frames 111 and 112 and the two coupled frames 113 and 114; and the keyboard 162 detachably mounted on the keyboard stage 161.

Also, as illustrated in FIGS. 13 and 19, the keyboard stage 161 has the latch mechanism 1611, which is a locking mechanism for detachably locking the keyboard 162 mounted on the keyboard stage 161.

Therefore, in the using state, the user may select both using modes, which are the mode to use the keyboard 162 in a state of being mounted on the keyboard stage 161 and the mode to use the keyboard 162 in a state of being detached from the keyboard stage 161. Also, the latch mechanism 1611 may surely lock the keyboard 162 to the keyboard stage 161 and may release the lock more easily.

The supporting member 180 formed of the pair of supporting pieces supported on the lower sides of the pair of frames serves to rotatably support the keyboard module 160 between the using state and the stowed state illustrated in FIGS. 2, 3, 5 and 6 in which the keyboard module 160 is rotated in a direction to lift up a front side end edge thereof in the using state as illustrated in FIGS. 16 and 17 to be vertically arranged as illustrated in FIGS. 14 and 15, and then stowed on a rear side of the image display module 120 in a state of being slid downward, around a rotation axis extending between the pair of frames while passing in the vicinity of back side end edges in the using state illustrated in FIG. 18 in which the operational keys 1621 lying upward.

Also, the keyboard module 160 is rotated by passing through a space defined with the lower end of the image display module 120 and the pair of frames between the stowed state and the using state, in a state in which the image display module 120 is slid upward.

In this manner, when sliding the image display module 120 downward after rotating the keyboard module 160 from the using state to the stowed state, the keyboard module 160 is stowed on the rear side of the image display module 120. Therefore, the display screen 122*a* is exposed even in the stowed state in which the keyboard module 160 is stowed. Therefore, for example, if the desktop PC 100 of this embodiment is the desktop PC having a mode without need of the keyboard 162, a negative effect to aesthetic appearance due to the keyboard 162 that is not used in this mode, hanging forward is solved, when the desktop PC 100 is used in the mode without need of the keyboard 162.

Figure 23:
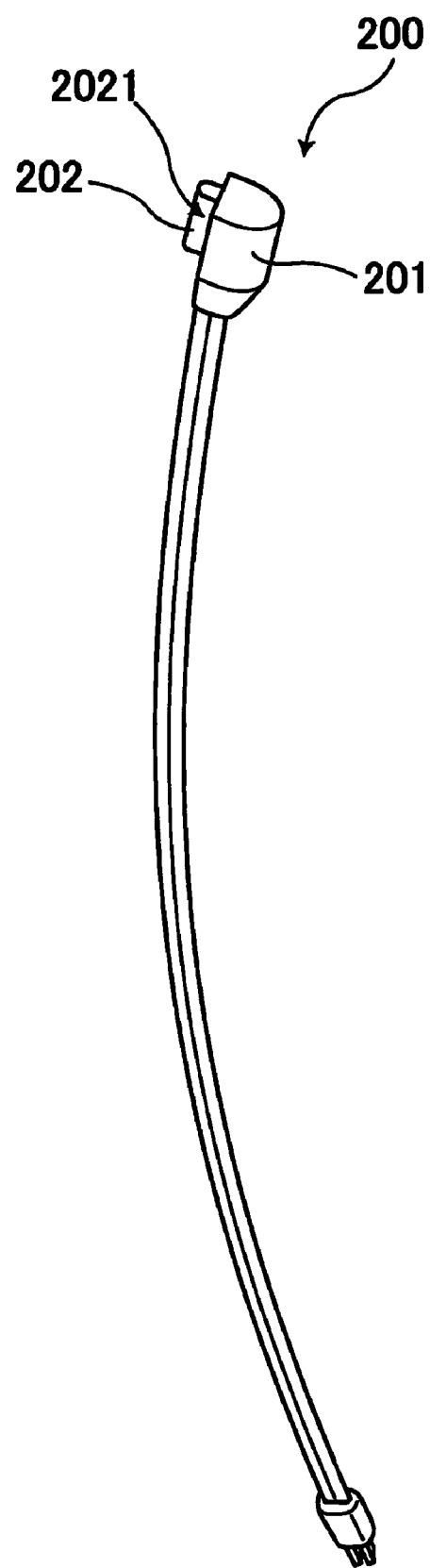
FIG. 23 is an external perspective view of an AC adapter 200.
Figure 24:
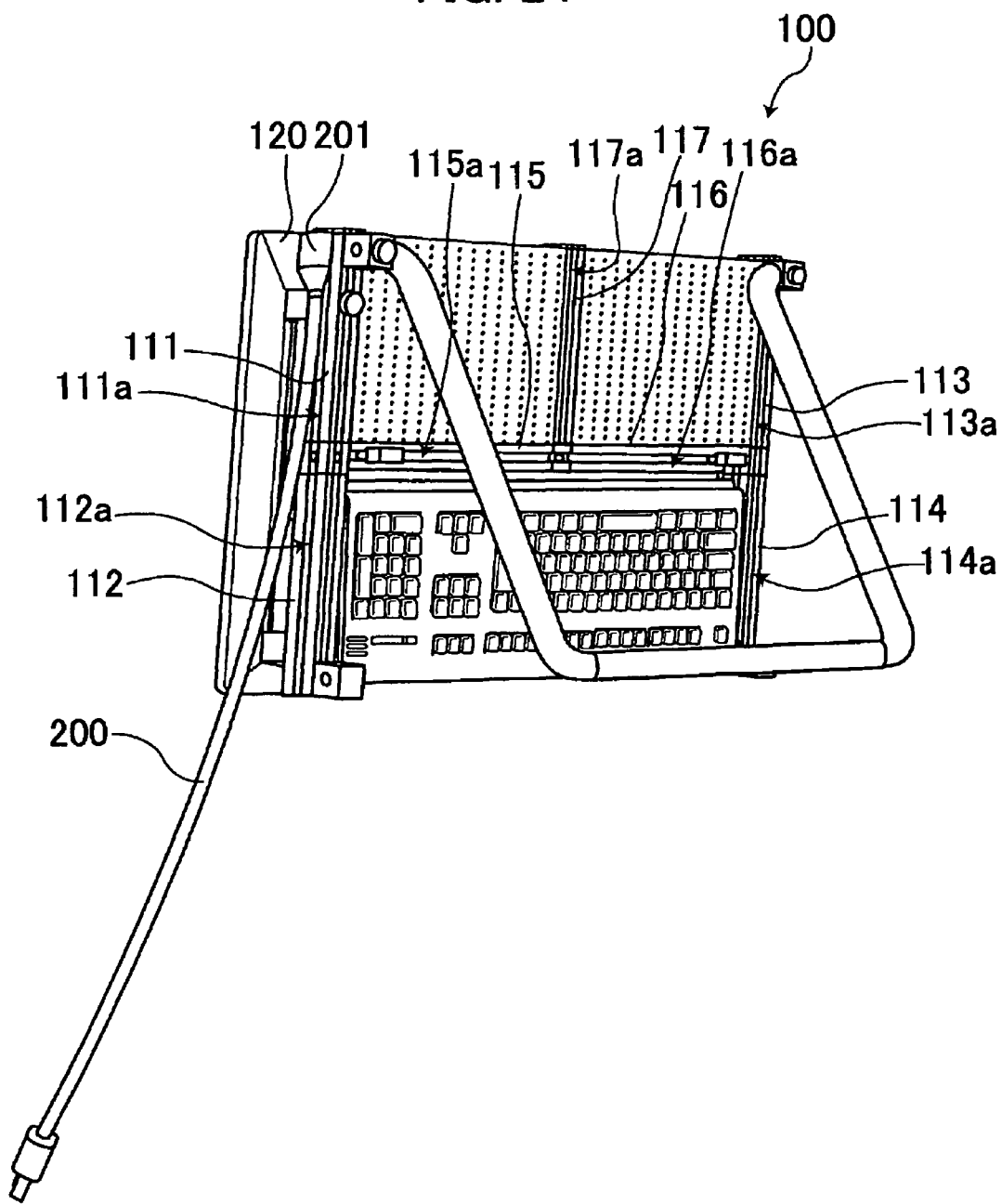
FIG. 24 is a rear external perspective view of the desktop PC to which the AC adapter illustrated in FIG. 23 is connected, laterally obliquely seen.

FIG. 23 is an external perspective view of an AC adapter 200; and FIG. 24 is a rear external perspective view of the desktop PC 100 to which the AC adapter 200 illustrated in FIG. 23 is connected, laterally obliquely seen.

The AC adapter 200 illustrated in FIGS. 23 and 24 has a power converting section 201 for converting AC power to DC power to be supplied to the image display module 120, the main unit module 130, the connector module 140 and the keyboard module 160; and an adapter side power terminal 2021 contacting the frame side power terminal 1111 for supplying the DC power obtained by the power converting section 201 to the frame side power terminal 1111; and is provided with a power supplying section 202 supported on any of plural or consecutive positions of the frames 111, 112, 113, 114, 115, 116 and 117. The power supplying section 202 has a convex stripe shape, which detachably fits in the grooves 111*a*, 112*a*, 113*a*, 114*a*, 115*a*, 116*a* and 117*a* formed on the frames 111, 112, 113, 114, 115, 116 and 117, respectively.

By connecting the AC adapter 200 to the AC power, the DC power is stably supplied to the image display module 120, the main unit module 130, the connector module 140 and the keyboard module 160. Also, the power supplying section 202 is supported on any of the plural or consecutive positions of the frames 111, 112, 113, 114, 115, 116 and 117, so that a degree of freedom in installing the AC adapter 200 is high.

Figure 25:
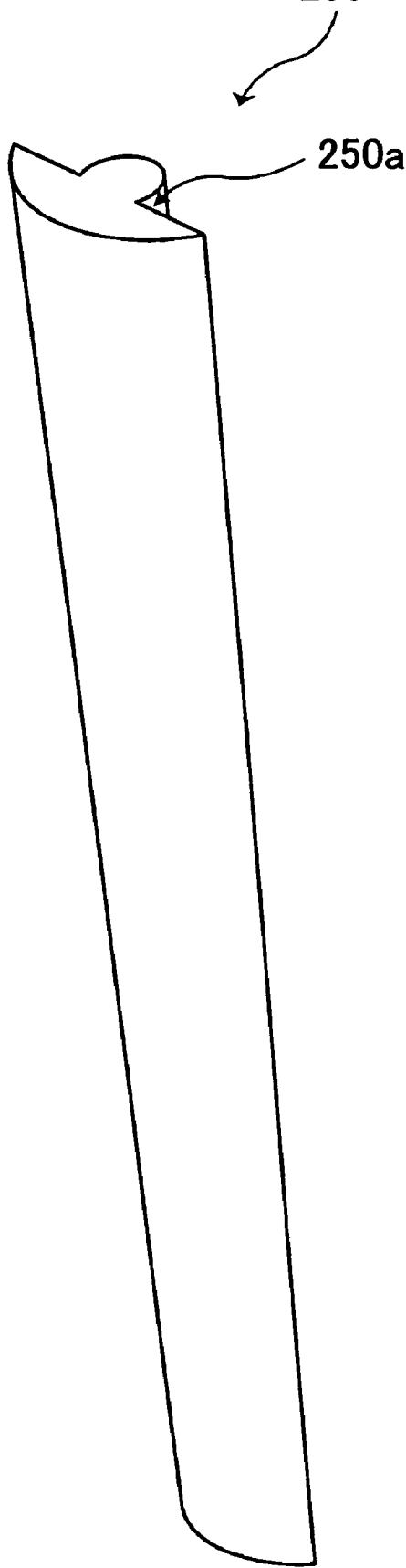
FIG. 25 is an external perspective view of a protecting member.
Figure 26:
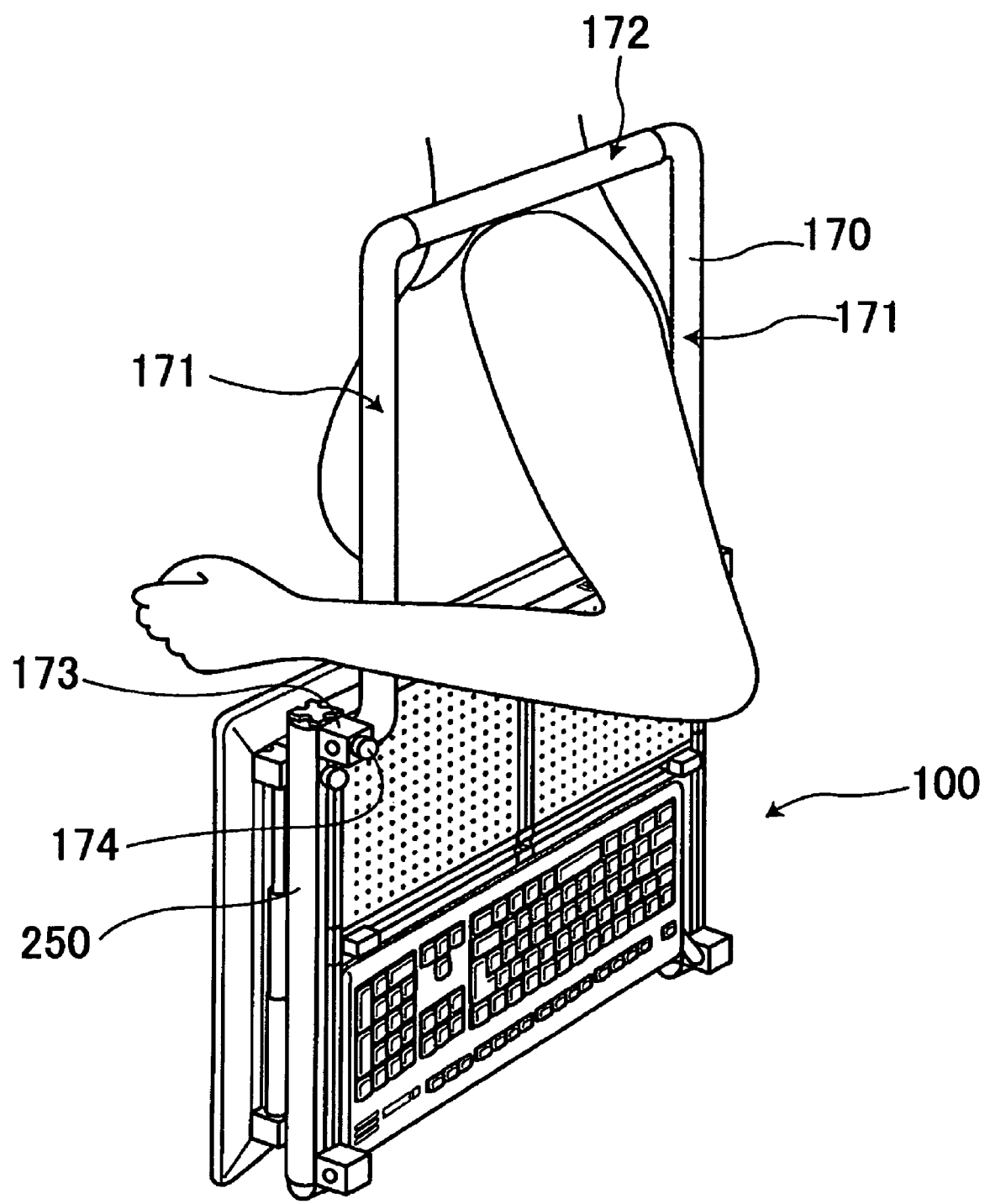
FIG. 26 is a rear external perspective view of the desktop PC further provided with the protecting member illustrated in FIG. 25, obliquely seen from above.

FIG. 25 is an external perspective view of a protecting member 250; and FIG. 26 is a rear external perspective view of the desktop PC 100 further provided with the protecting member 250 illustrated in FIG. 25, obliquely seen from above.

The protecting member 250 illustrated in FIG. 25 is formed of the elastic material having a convex stripe 250*a*, which detachably fits in the grooves 111*a*, 112*a*, 113*a*, 114*a*, 115*a*, 116*a* and 117*a* formed on the frames 111, 112, 113, 114, 115, 116 and 117, respectively. Also, the protecting member 250 serves to cover the frame side power terminal 1111 (refer to FIG. 7) and the frame side signal terminal 1112 (refer to FIG. 7) as illustrated in FIG. 26.

Therefore, the frame side power terminal 1111 and the frame side signal terminal 1112 are protected from dust and humidity, and electrification and short circuit are prevented from occurring. Also, the user is prevented from being injured by touching the frames 111, 112, 113, 114, 115, 116 and 117. Further, since a shock to the frames 111, 112, 113, 114, 115, 116 and 117 is moderated, damage of the frames 111, 112, 113, 114, 115, 116 and 117 and the frame side power terminal 1111 and the frame side signal terminal 1112 provided on the frames 111, 112, 113, 114, 115, 116 and 117 is prevented.

Figure 27:
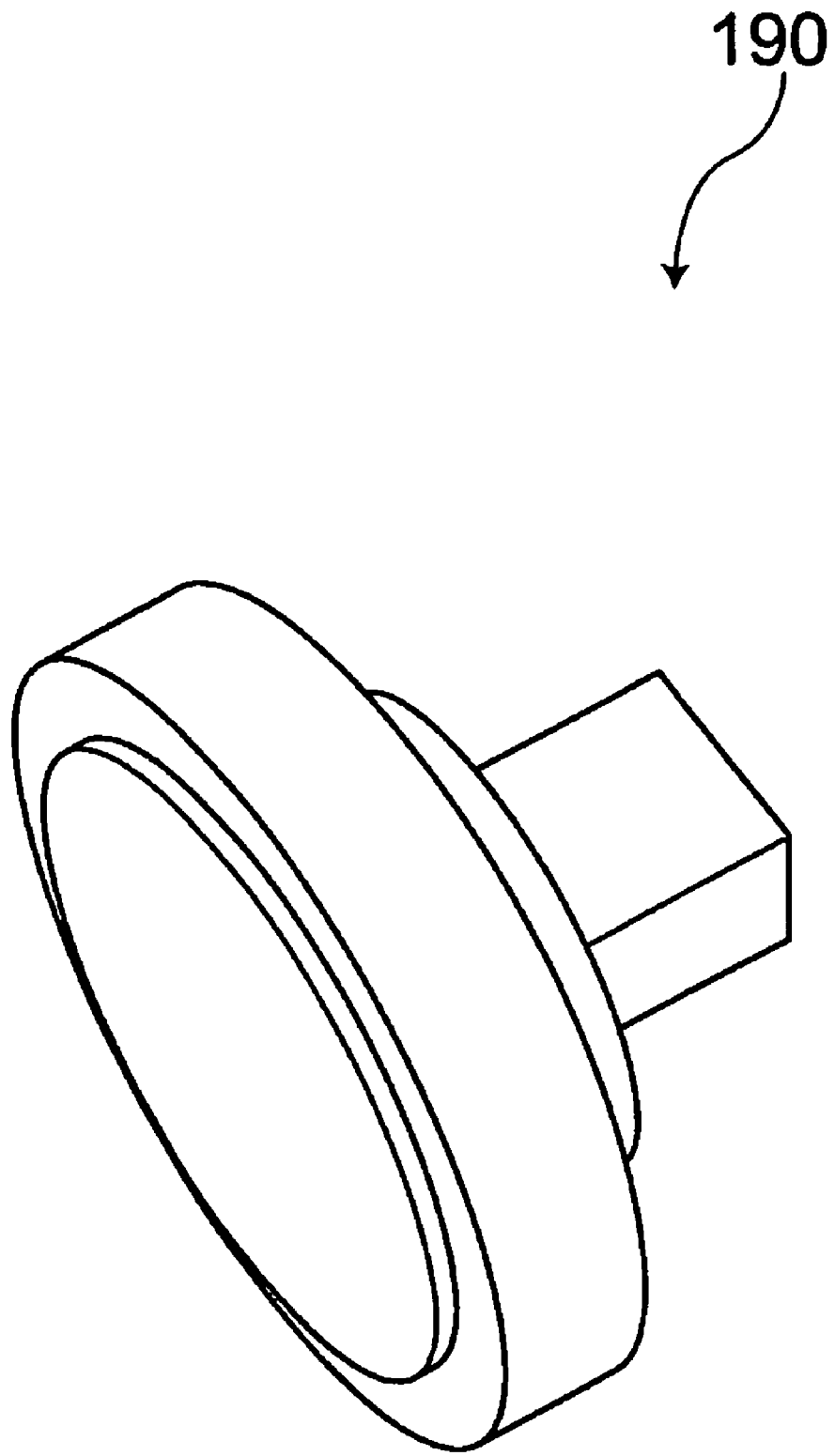
FIG. 27 is an external perspective view of a wheel.
Figure 28:
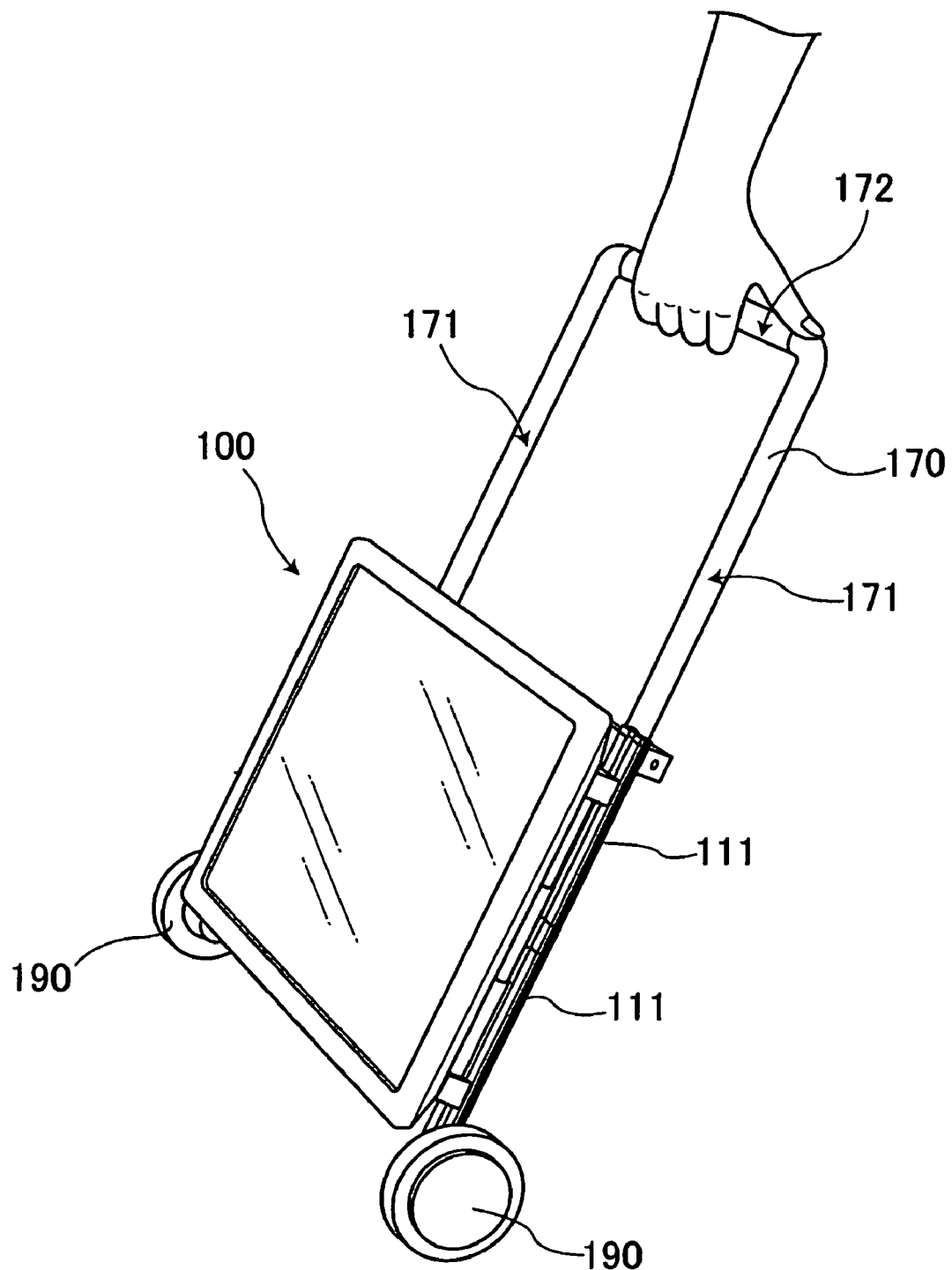
FIG. 28 is an external perspective view of the desktop PC further provided with the wheel illustrated in FIG. 27.

FIG. 27 is an external perspective view of a wheel 190; and FIG. 28 is an external perspective view of the desktop PC 100 further provided with the wheel 190 illustrated in FIG. 27.

The wheel 190 illustrated in FIG. 27 is attached to the lower ends of the pair of frames formed of the two coupled frames 111 and 112 and the two coupled frames 113 and 114.

The wheels 119 reduce the load of the user when carrying the desktop PC 100.

Figure 29:
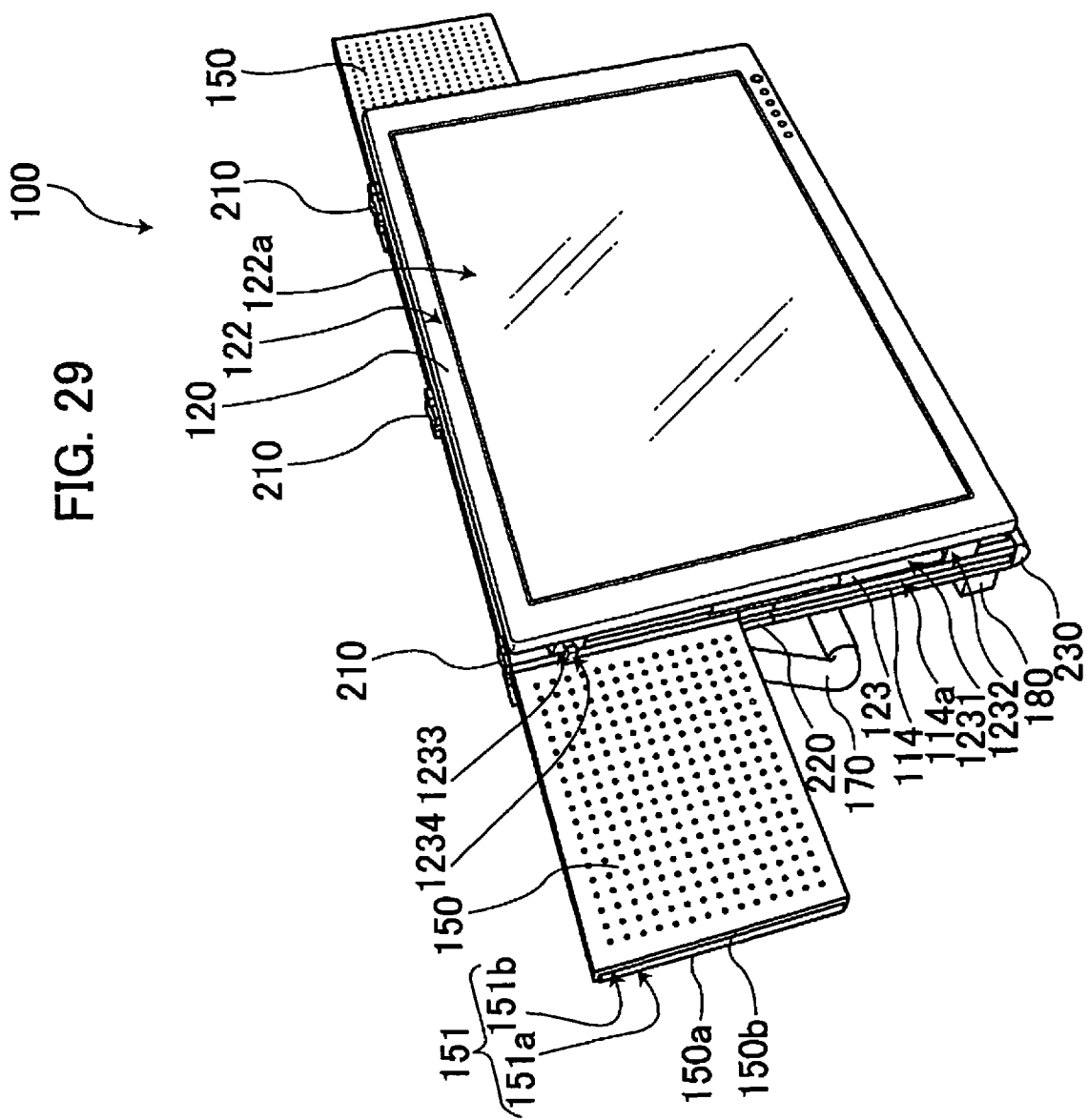
FIG. 29 is a front external perspective view of the desktop PC on which a speaker module is further mounted, laterally obliquely seen.
Figure 30:
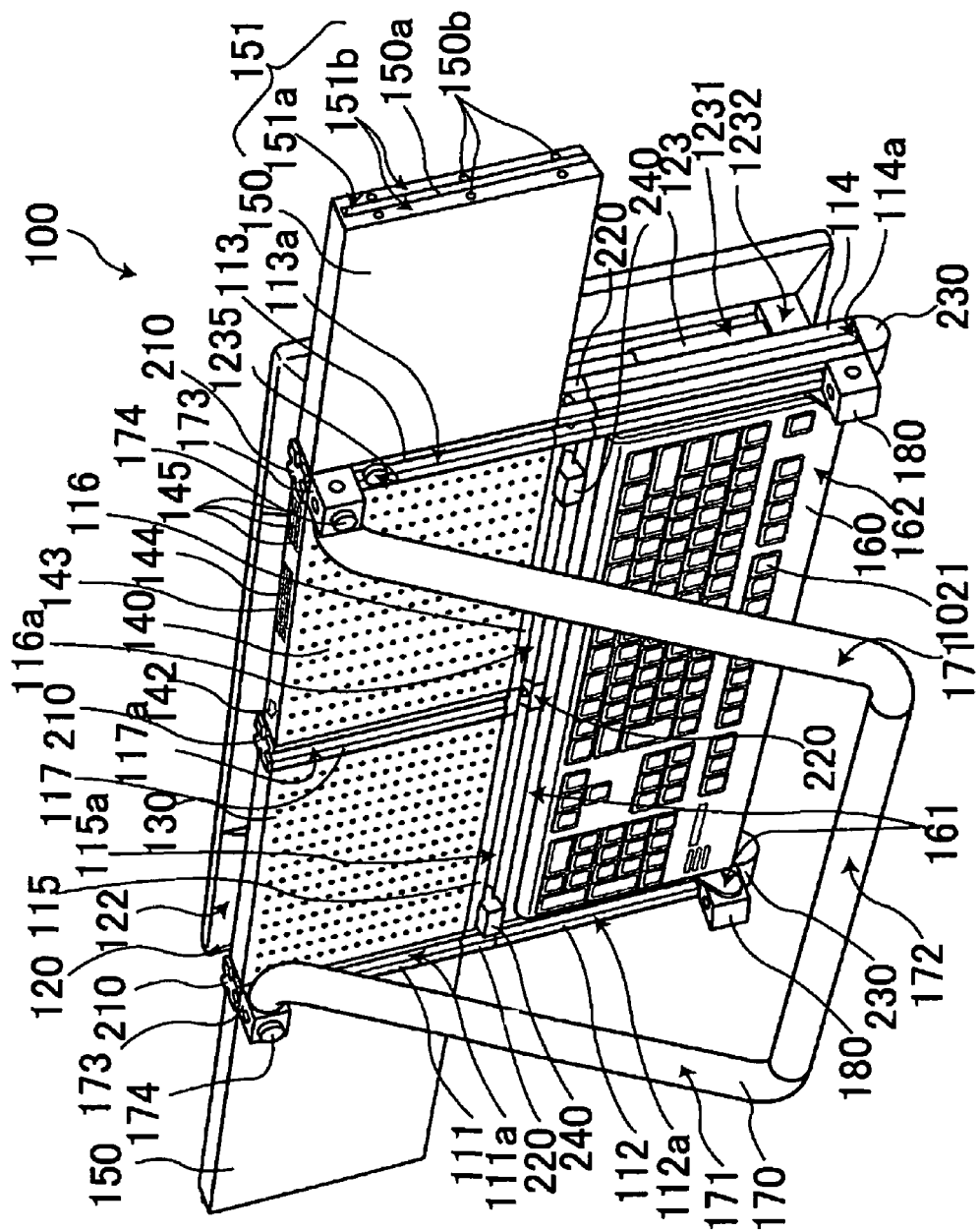
FIG. 30 is a rear external perspective view of the desktop PC illustrated in FIG. 29, laterally obliquely seen.

FIG. 29 is a front external perspective view of the desktop PC 100 on which a speaker module 150 is further mounted, laterally obliquely seen; and FIG. 30 is a rear external perspective view of the desktop PC 100 illustrated in FIG. 29, laterally obliquely seen.

The speaker module 150 is provided with a speaker, and has a frame receiving section 151 detachably supported so as to be slidable up and down by the pair of frames formed of the two coupled frames 111 and 112 and the two coupled frames 113 and 114 out of the seven frames 111, 112, 113, 114, 115, 116 and 117.

Also, the speaker module 150 has protrusions 151*a*, which slidably and detachably fit in the grooves 111*a*, 112*a*, 113*a* and 114*a* of the frames 111, 112, 113 and 114, respectively, on both right and left side surfaces of the speaker module 150, and wall surfaces 151*b* on both sides of the protrusion 151*a* have shapes to abut the wall surfaces on both sides of the grooves 111*a*, 112*a*, 113*a* and 114*a* of the frames 111, 112, 113 and 114, respectively. A combination of the protrusion 151*a* and the wall surfaces 151*b* is the frame receiving section 151 of the speaker module 150. Also, the main unit module side power terminal 150*a* to be supplied with the power from the frames 111, 112, 113 and 114 is provided on the protrusion 151*a* of the frame receiving section 151. Also, the main unit module side signal terminal 150*b* for transmitting the signal between the speaker module 150 and the outside is provided on the wall surface 151*b* of the frame receiving section 151.

Figure 31:
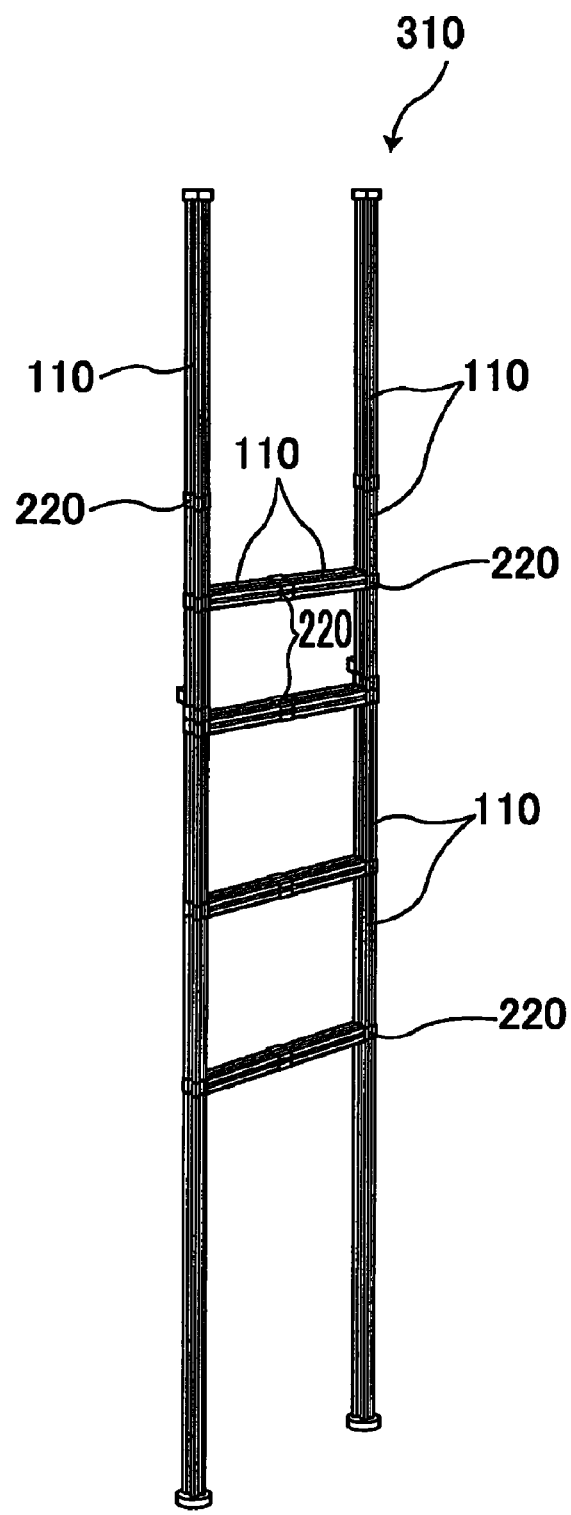
FIG. 31 is a front external perspective view of the frame of another mode, laterally obliquely seen.
Figure 32:
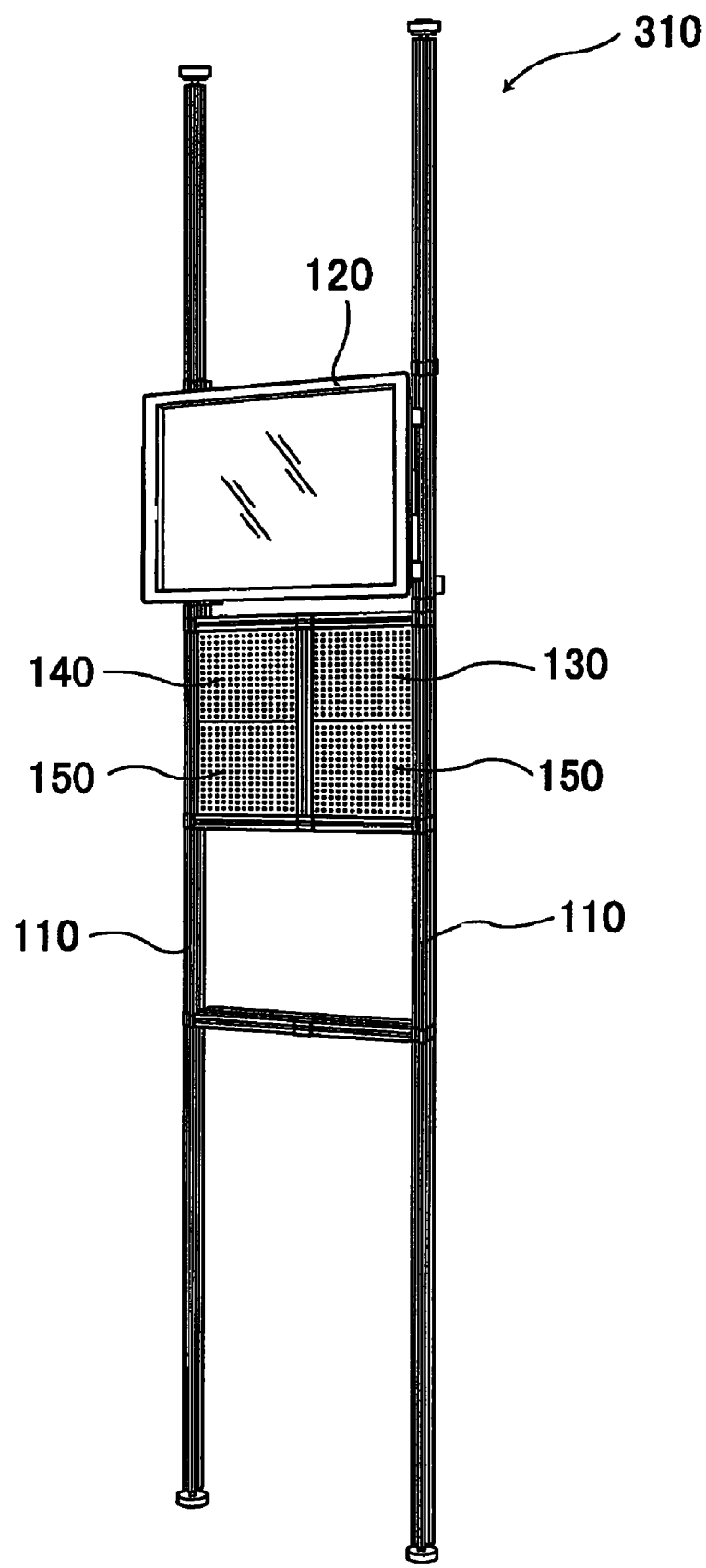
FIGS. 32 to 34 are front external perspective views of the mode using the frame illustrated in FIG. 31, laterally obliquely seen.
Figure 33:
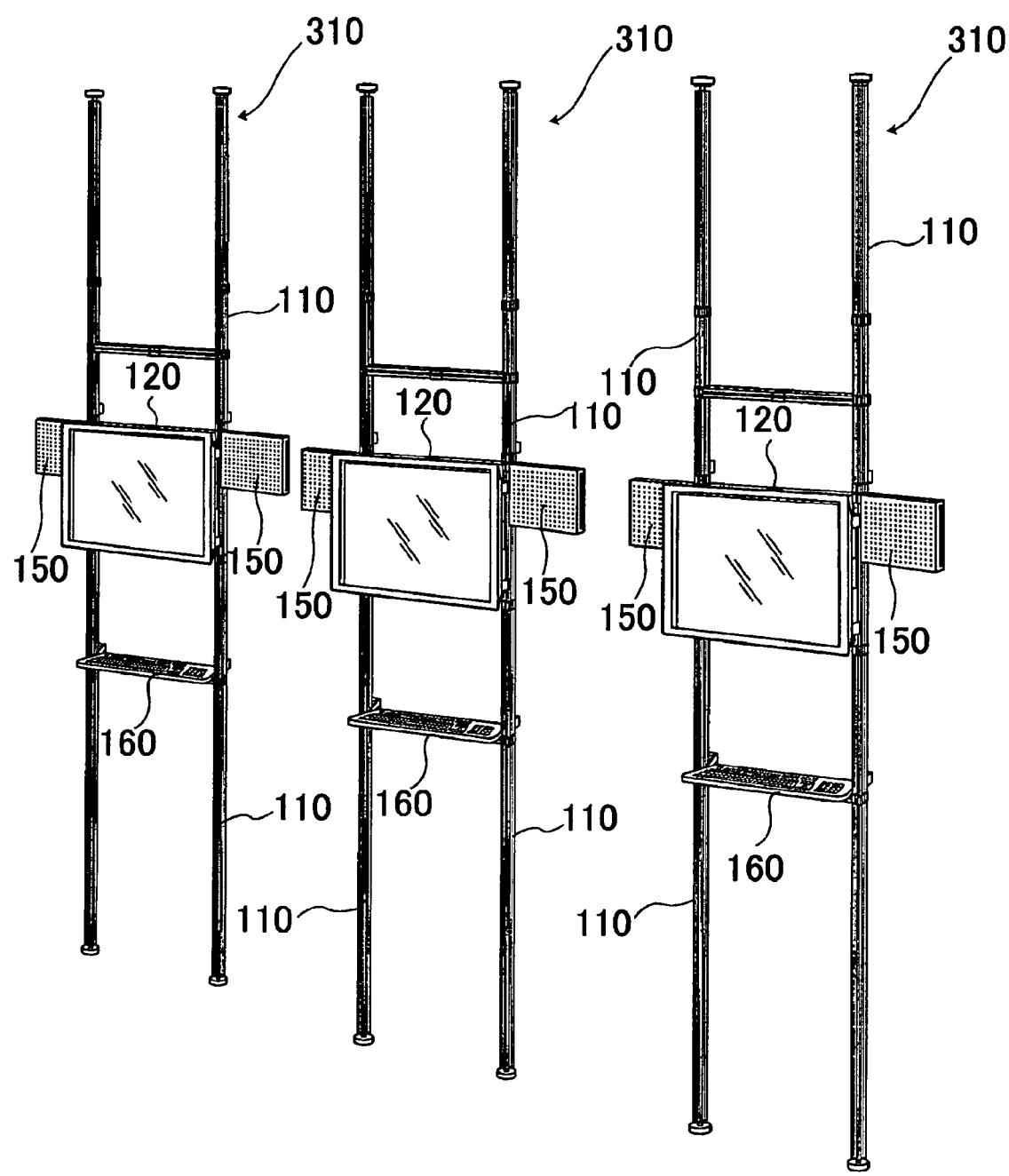
Figure 34:
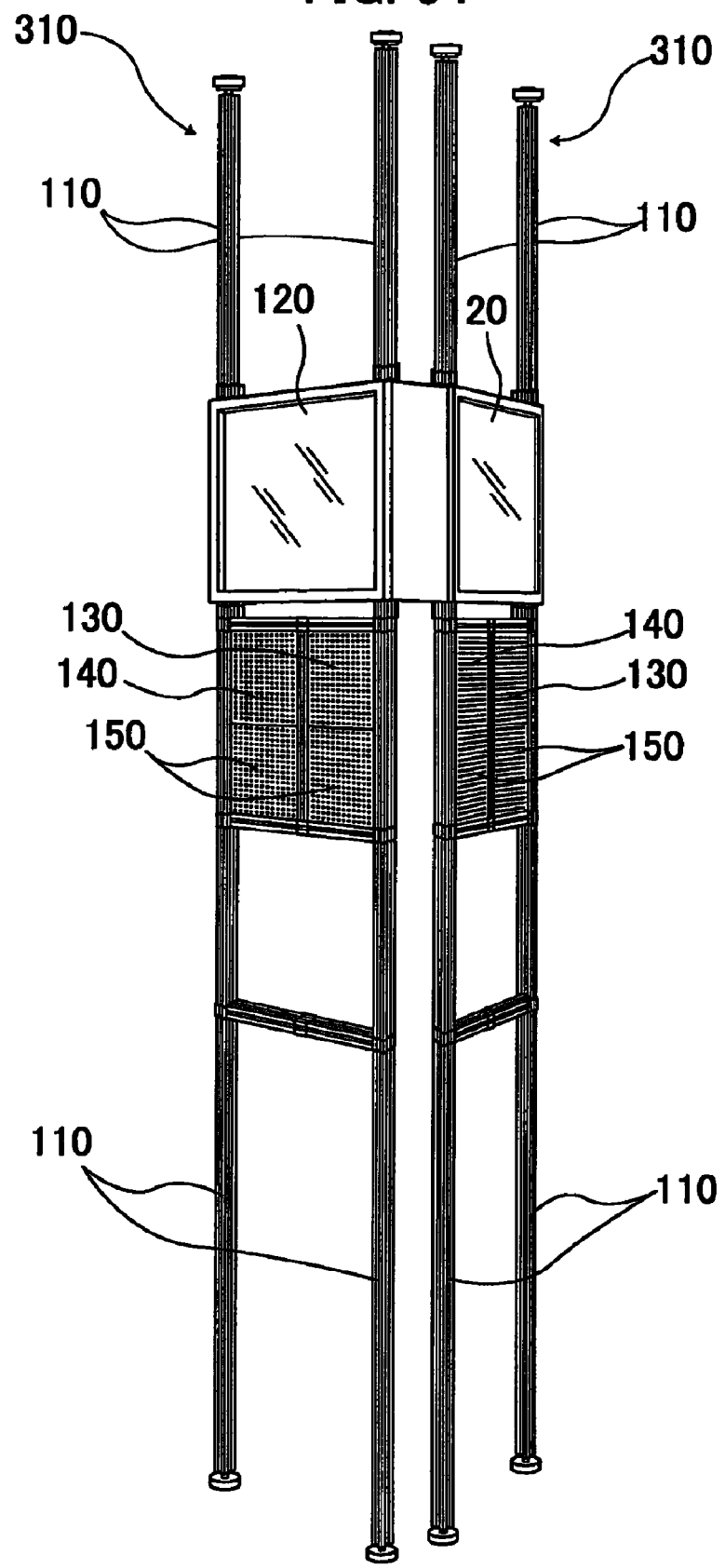

FIG. 31 is a front external perspective view of the frame 110 of another mode, laterally obliquely seen; and FIGS. 32 to 34 are front external perspective views of the mode using the frame illustrated in FIG. 31, laterally obliquely seen.

A frame 310 illustrated in FIG. 31 is obtained by coupling the frames 110 by using the joint parts 220. The frame 110 has a cross section identical to that of the seven frames 111, 112, 113, 114, 115, 116 and 117 and has a bar shape, and the frame 310 serves to support various modules such as the image display module 120, the main unit module 130, the connector module 140, the speaker module 150 and the keyboard module 160.

It is possible to use a mode in which the frame 310 illustrated in FIG. 31 serves to support the image display module 120, the main unit module 130, the connector module 140 and the speaker module 150 as illustrated in FIG. 32; a mode in which three frames 310 illustrated in FIG. 31 are arranged in parallel serving to support the image display module 120, the speaker module 150 and the keyboard module 160 as illustrated in FIG. 33; and a mode in which two frames 310 illustrated in FIG. 31 are closely arranged to each other serving to support the image display module 120, the main unit module 130, the connector module 140 and the speaker module 150 as illustrated in FIG. 34.

Figure 35:
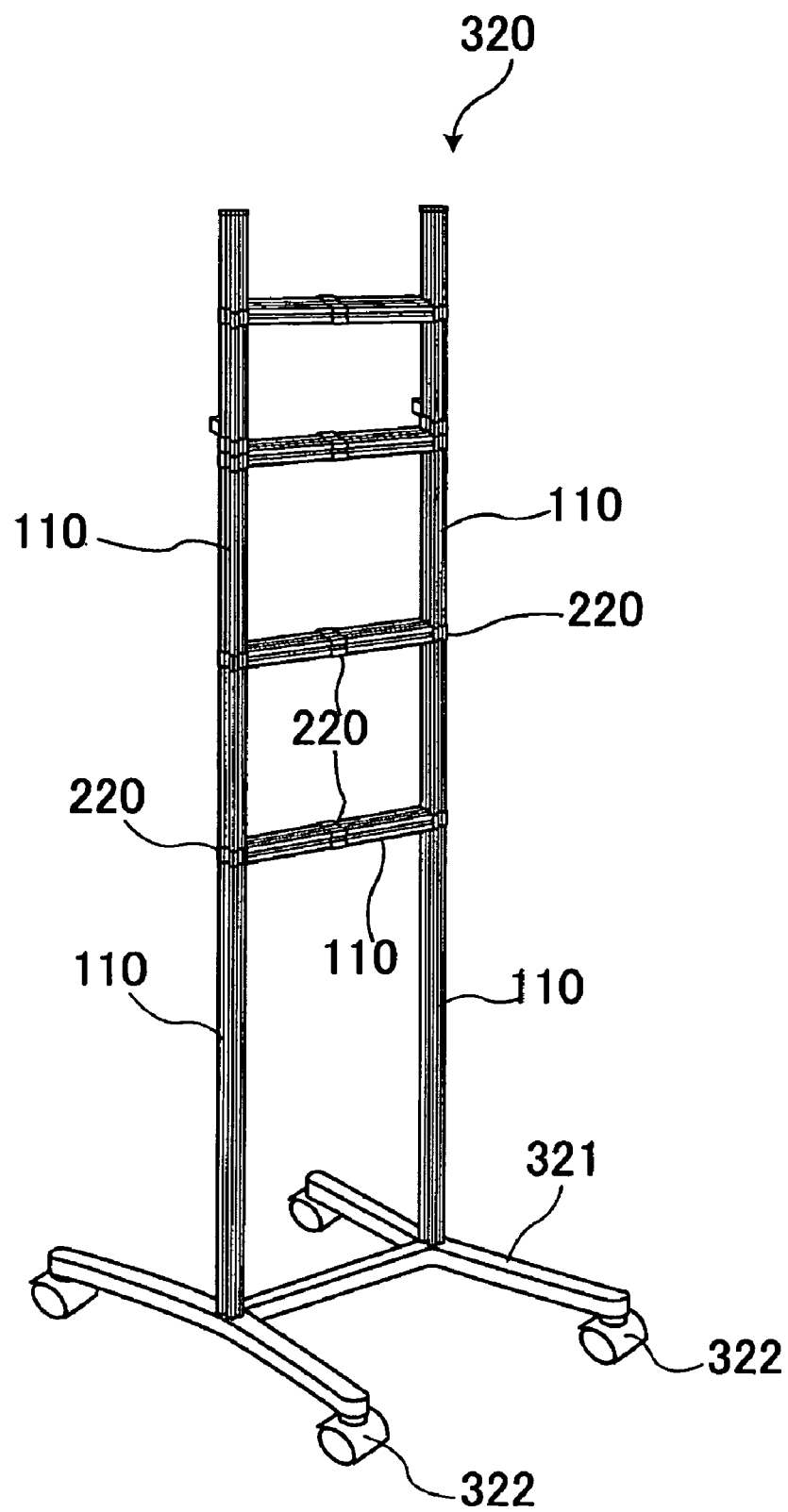
FIG. 35 is a front external perspective view of the frame of yet another mode, laterally obliquely seen.
Figure 36:
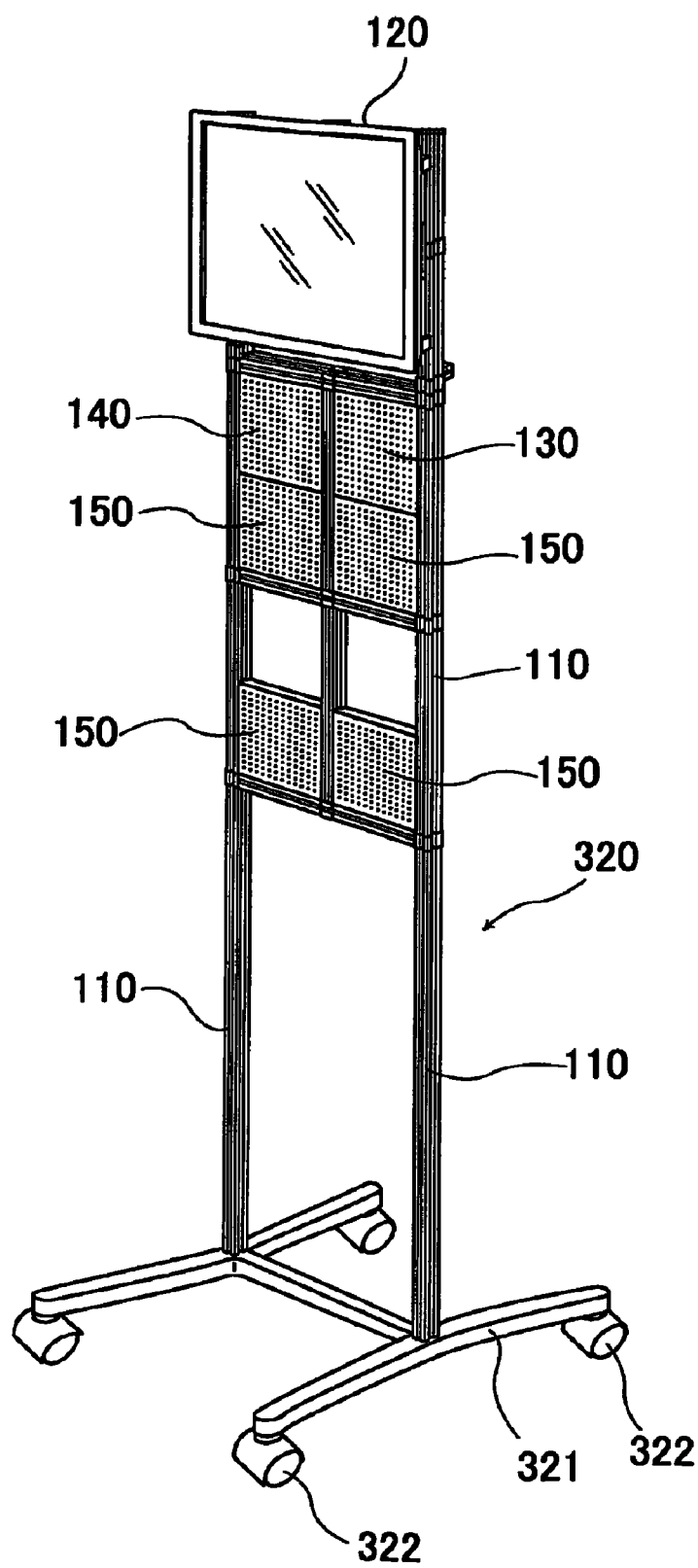
FIG. 36 is a front external perspective view of the mode using the frame illustrated in FIG. 35, laterally obliquely seen.

FIG. 35 is a front external perspective view of the frame of yet another mode, laterally obliquely seen; and FIG. 36 is a front external perspective view of the mode using the frame illustrated in FIG. 35, laterally obliquely seen.

A frame 320 illustrated in FIG. 35 is obtained by coupling the frames 110 by using the joint parts 220 as in the case of the frame 310 illustrated in FIG. 31, and is further provided with a frame supporting section 321 and a caster 322 on a lower end thereof. The frame 320 also serves to support various modules such as the image display module 120, the main unit module 130, the connector module 140, the speaker module 150 and the keyboard module 160.

As illustrated in FIG. 36, it is possible to use a mode in which the frame 310 illustrated in FIG. 31 serves to support the image display module 120, the main unit module 130, the connector module 140 and the speaker module 150.

Meanwhile, although the desktop PC as one example of the electronic device is described in the embodiments, the invention is not limited to this.

Further, although the image display module, the main unit module and the connector module are mentioned as examples of the modules in the embodiments, the invention is not limited to this, and a bay module to store the hard disk and various drives may be used, for example.

Moreover, although the example in which the power supply and the signal transmittance are performed by the different terminals is described in the embodiments, the invention is not limited to this, and the power supply and the signal transmittance may be performed by a same terminal by employing so-called power line communication (PLC) for transmitting the signal by using a power line, for example.

Still further, although the example of sliding the image display module up and down by using the extendable pole, which is the up-and-down damper, is described in the embodiments, the invention is not limited to this, and any mechanism may be used as long as the mechanism may slide the image display module up and down.

In addition, although the example of latch mechanism that detachably locks the keyboard mounted on the keyboard stage is described in the embodiments, the invention is not limited to the latch mechanism, and any locking mechanism may be used as long as the locking mechanism may detachably lock the keyboard.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An electronic device, comprising:
a frame that extends in a bar shape and has a groove extending in a longitudinal direction; and
a module that has a frame receiving section which has a protrusion fitting in the groove, where wall surfaces on both sides of the protrusion have shapes to abut wall surfaces on both sides of the groove of the frame, and which is supported by the frame through fitting of the protrusion in the groove, wherein
the module comprises a module side power terminal that is supplied with electric power from the frame, on the protrusion of the frame receiving section, and
the frame comprises, in the groove, a frame side power terminal that supplies electric power to the module side power terminal in a state in which the frame receiving section is supported by the frame.

2. The electronic device according to claim 1, wherein
the module further comprises, along with the module side power terminal on the protrusion of the frame receiving section, a module side signal terminal that transmits a signal between the module and the outside, on the wall surfaces on the both sides of the protrusion of the frame receiving section, and
the frame further comprises, along with the frame side power terminal in the groove, a frame side signal terminal that relays a signal transmitted between the module side signal terminal and the outside, on the wall surfaces on the both sides of the groove.

3. The electronic device according to claim 1, further comprising another module having a second frame receiving section supported by the frame,
wherein the another module has a function different from the function of the module, and comprises a second module side power terminal that is supplied with electric power from the frame side power terminal.

4. The electronic device according to claim 3, wherein the another module further comprises, along with the second module side power terminal, a second module side signal terminal that transmits a signal between the another module and the outside, on the second frame receiving section of the another module.

5. The electronic device according to claim 1, wherein the frame side power terminal is a power terminal extending in the longitudinal direction of the frame, and further comprises an AC adapter having a power converting section that converts AC power to DC power to be supplied to the module and a power supplying section that is supported on any of plural or consecutive positions of the frame and that has an adapter side power terminal contacting the frame side power terminal to supply the DC power obtained by the power converting section to the frame side power terminal.

6. The electronic device according to claim 1, wherein the module is an image display module having a display screen on the front thereof.

7. The electronic device according to claim 1, wherein the module is a main unit module incorporating a circuit board on which a CPU that executes a program is mounted.

8. The electronic device according to claim 1, wherein the module is a connector module provided with at least one of a data communication connector to which a communication cable for data communication is connected, a media slot to which a recording medium is removably inserted, and a PC card slot to which a PC card is removably inserted.

9. The electronic device according to claim 1, wherein the module is a speaker module provided with a speaker.

10. The electronic device according to claim 1, further comprising a protecting member having a convex stripe detachably fitting in the groove formed on the frame, so as to cover the frame side power terminal.

11. The electronic device according to claim 10, wherein the protecting member is formed of an elastic material.

12. The electronic device according to claim 1, further comprising a cap that fits in an end of the frame.

13. A frame that extends in a bar shape and has a groove extending in a longitudinal direction and supports a frame receiving section of a module, the frame receiving section having a protrusion fitting in the groove, where wall surfaces on both sides of the protrusion have shapes to abut wall surfaces on both sides of the groove of the frame, through fitting of the protrusion in the groove, the frame comprising:

a frame side power terminal, in the groove, that supplies electric power from the protrusion fitted in the groove, of the frame receiving section, to the module.

14. The frame according to claim 13, further comprising a frame side signal terminal that relays transmission of a signal between the module and the outside through the frame receiving section.

15. The frame according to claim 13, wherein the frame supports a power supplying section for DC power supply of an AC adapter that converts AC power to DC power to be supplied to the module, on any of plural or consecutive positions, and the frame side power terminal passes through the plural or consecutive positions to extend in the longitudinal direction of the frame, and is supplied with the DC power from the power supplying section.

\* \* \* \* \*